United States Patent [19]
Fujii et al.

[11] Patent Number: 6,026,245
[45] Date of Patent: Feb. 15, 2000

[54] IMAGING APPARATUS

[75] Inventors: Naoki Fujii, Hachioji; Tatsuo Kitazawa, Hino; Tatsuya Suzuki, Tokyo, all of Japan

[73] Assignee: Olympus Optical Co., Ltd., Tokyo, Japan

[21] Appl. No.: 08/690,250

[22] Filed: Jul. 19, 1996

[30] Foreign Application Priority Data

Jul. 20, 1995 [JP] Japan ..................................... 7-184192

[51] Int. Cl.[7] .................................................. G03B 17/00
[52] U.S. Cl. ............................................. 396/85; 396/301
[58] Field of Search ................................ 396/85, 86, 87, 396/72, 301, 529, 129

[56] References Cited

U.S. PATENT DOCUMENTS

| | | | |
|---|---|---|---|
| 4,860,113 | 8/1989 | Miyamoto et al. | 396/529 X |
| 5,037,187 | 8/1991 | Oda et al. | 396/85 X |
| 5,241,422 | 8/1993 | Shimada et al. | 396/85 X |
| 5,572,270 | 11/1996 | Yamamoto et al. | 396/86 |
| 5,666,565 | 9/1997 | Wakabayashi et al. | 396/85 X |
| 5,678,096 | 10/1997 | Wakabayashi et al. | 396/87 X |

FOREIGN PATENT DOCUMENTS

| | | |
|---|---|---|
| 57-9914 | 1/1982 | Japan . |
| 61-206943 | 12/1986 | Japan . |
| 62-100744 | 5/1987 | Japan . |
| 63-90883 | 6/1988 | Japan . |

*Primary Examiner*—W. B. Perkey
*Attorney, Agent, or Firm*—Louis Weinstein

[57] ABSTRACT

An imaging apparatus having a main power source in a main unit thereof, a lens frame supported so that it can be moved in an optical-axis direction relative to the main unit of the imaging apparatus, a lens frame driving mechanism for advancing or withdrawing the lens frame in the optical-axis direction relative to the main unit of the imaging apparatus, an actuator placed in the lens frame, and a connector included in the lens frame driving mechanism in order to electrically connect the main unit of the imaging apparatus with the actuator and supply power or a driving signal to the actuator.

62 Claims, 19 Drawing Sheets

IMAGING APPARATUS

BACKGROUND OF THE INVENTION

1. Field of the Invention

The present invention relates to an imaging apparatus, or more particularly, to an imaging apparatus from which a photographic lens can be separated and in which a main power source is included in a main unit of the imaging apparatus.

2. Description of the Related Art

In the past, connection using a flexible printed-circuit board has generally been adopted in order to electrically connect a lens holding frame with a main unit of an imaging apparatus while absorbing a stroke of the lens holding frame that moves in an optical-axis direction along with a power variation operation or focus operation. For example, an example has been proposed in Japanese Unexamined Utility Model Publication No. 61-206943. This is regarded as a first prior art.

The first prior art is such that entities whose positions change relatively are mutually connected by utilizing elastic deformation of a flexible printed-circuit board, and has such an advantage that an electrical resistance does not differ from that of a normal rigid printed-circuit board.

For placing a flexible printed-circuit board that can be deformed flexibly in a limited space within a lens barrel, it is required to efficiently avoid interference with other members and minimize the space occupied by the flexible printed-circuit board. For this purpose, a countermeasure such as inclusion of a means for controlling the position of a flexible printed-circuit board which moves unitedly with the lens barrel is sometimes taken. Moreover, the flexible printed-circuit board is provided with two or more conduction lines in order to control a focus mechanism and shutter mechanism within a lens holding frame.

Japanese Unexamined Utility Model Publication No. 57-9914 has proposed a technical means in which, when a focus lens driving mechanism to be driven for a focus operation, a shutter driving mechanism, or the like is incorporated in a lens holding frame that moves in an optical-axis direction along with a power variation operation, the motive power of an actuator locked in a main unit of an imaging apparatus is used to control the driving of the mechanism. This shall be regarded as a second prior art.

In other words, the second prior art is such that an actuator fixed to a main unit of an imaging apparatus is driven by a power source locked in the main unit of the imaging apparatus, and the motive power is conveyed to a driving mechanism within a lens holding frame. At this time, motive power conveyance is achieved by a mechanism composed of a lever, a link, a gear (long-span gear in which the length of teeth to be meshed with one another in an optical-axis direction is large), and the like so that the motive power can be conveyed reliably irrespective of a shift of the lens holding frame in the optical-axis direction relative to the main unit of the imaging apparatus.

Using the technical means having the foregoing components, it becomes unnecessary to include an actuator, which drives a driving mechanism within a lens holding frame, in the lens holding frame. The lens holding frame that is a movable member becomes compact and lightweight. Moreover, there are such advantages that it becomes unnecessary to supply electric power used to drive the actuator from a main unit of an imaging apparatus to the lens holding frame, and that therefore the number of electrical connections becomes small or the electrical connections become unnecessary.

Moreover, Japanese Unexamined Utility Model Publication No. 63-90883 has proposed a technique in which a circuit pattern is molded unitedly with a jut formed on a plastic body of an electrical equipment or the like, then the circuit pattern is electrically connected to a circuit pattern on a printed-circuit board, and thus space use efficiency of lines is improved. This shall be regarded as a third prior art.

Furthermore, Japanese Unexamined Utility Model Publication No. 61-206943 has proposed a technical means in which a light emitting device or light receiving device is placed in both a lens barrel, which is inserted into a mount of a camera body and placed so that the lens barrel can be moved freely in an optical-axis direction relative to the mount, and the camera body for the purpose of signal transmission. This shall be regarded as a fourth prior art.

Moreover, Japanese Unexamined Patent Publication No. 62-100744 has disclosed a technical means in which a plurality of segments having two kinds of reflectances; large and small reflectances are placed on a side of a photographic lens opposed to a camera body in order to convey information of the photographic lens to the camera body. This shall be regarded as a fifth prior art.

In this case, light emitting devices are placed in the camera body in association with the segments. Thus, a binary-coded signal corresponding to the large or small reflectance of each segment can be transmitted from the lens to the camera body without the necessity of an electrical connection means.

However, in the first prior art, the flexible printed-circuit board repeats deformation along with the movement of the lens holding frame all the time. An adverse effect of a flare, ghost, or the like, which results from reflection of abaxial rays or the like within the lens barrel, on optical performance is unavoidable.

Connection using a flexible printed-circuit board is intended to absorb the changes in relative position of a movable lens holding frame and a main unit of an imaging apparatus using deformation (bending) of the flexible printed-circuit board. Repeated occurrence of stress on a bend of the flexible printed-circuit board is unavoidable.

For avoiding a drawback such as disconnection deriving from a fatigue failure of a printed-circuit board, it is required to reserve a space of a certain size or larger for the bend and the like. Moreover, since two or more conduction lines are formed on the printed-circuit board, the lateral width of the board becomes large. This becomes an obstruction to realization of a compact design of a lens barrel.

Furthermore, although it is preferable to include a flexible printed-circuit board position control means in order to prevent interference with other members, the inclusion becomes a factor of increasing size and cost.

As mentioned above, while there has been a trend toward a longer stroke of a movement of a lens holding frame due to a higher power of a zoom lens in recent years, if a flexible printed-circuit board is used for electrical connections between the lens holding frame and a main unit of an imaging apparatus, there are many problems to be overcome and difficulties arise.

In the second prior art, although electrical connections between a lens holding frame and a main unit of an imaging apparatus become unnecessary, a mechanical member must be used to convey motive power. The space occupied by the power conveyance mechanical member makes a whole lens barrel large in size.

In particular, if the stroke of the movement of the lens holding frame increases with an increase in power of a zoom lens, problems occur: a coupler must be made larger in order to ensure mechanical coupling between the lens holding frame and the main unit of the imaging apparatus; a dead space within the lens barrel expands; and the accuracy in position control for driving deteriorates.

Moreover, the third prior art has the drawback that it cannot be used as electrical connection means of members that make a relative shift in position.

Furthermore, in the fourth prior art, signal transmission between a lens barrel and camera body is based on communications. An electrical connection means is needed to supply power to the lens barrel. An increase in the stroke of the movement in an optical-axis direction of the lens barrel is unpreferable in terms of space use efficiency.

When the fourth prior art is adapted for a case in which some group of lenses moves in the optical-axis direction inside the lens barrel during, for example, a focus operation in a zoom lens barrel, additional line connections are needed in the lens barrel.

Moreover, the fifth prior art poses no problem as long as information inherent to a photographic lens is transmitted to a camera body. However, for example, when an attempt is made to transmit a state transition of the lens as information to the camera body, the reflectances of segments are requested to be variable. In this case, the segments become considerably expensive.

Supposing all that is requested is identification of the kind of a lens, then no problem occurs. However, if an attempt is made to transmit a large quantity of information for the purpose of controlling focus lens driving or shutter driving, the number of segments and the numbers of associated light emitting devices and light receiving devices increase. This leads to an increase in cost.

OBJECTS AND SUMMARY OF THE INVENTION

A first object of the present invention is to provide a compact and highly reliable imaging apparatus.

A second object of the present invention is to provide an imaging apparatus in which the electrical connection between a main unit thereof and a lens barrel can be achieved simply and highly reliably.

A third object of the present invention is to provide an imaging apparatus in which the freedom of selecting a photographic power is intensified.

Briefly, an imaging apparatus of the present invention having a main power source in a main unit thereof comprises:

a lens frame supported so that it can be moved in an optical-axis direction relative to the main unit of the imaging apparatus;

a lens frame driving mechanism for advancing or withdrawing the lens frame in the optical-axis direction relative to the main unit of the imaging apparatus;

an actuator placed in the lens frame; and a connector included in the lens frame driving mechanism in order to electrically connect the main unit of the imaging apparatus and the actuator and supply power or a driving signal to the actuator.

These as well as other objects and advantages of the present invention will become further apparent from the following detailed explanation.

DETAILED DESCRIPTION OF THE PREFERRED EMBODIMENTS

Figure 1:
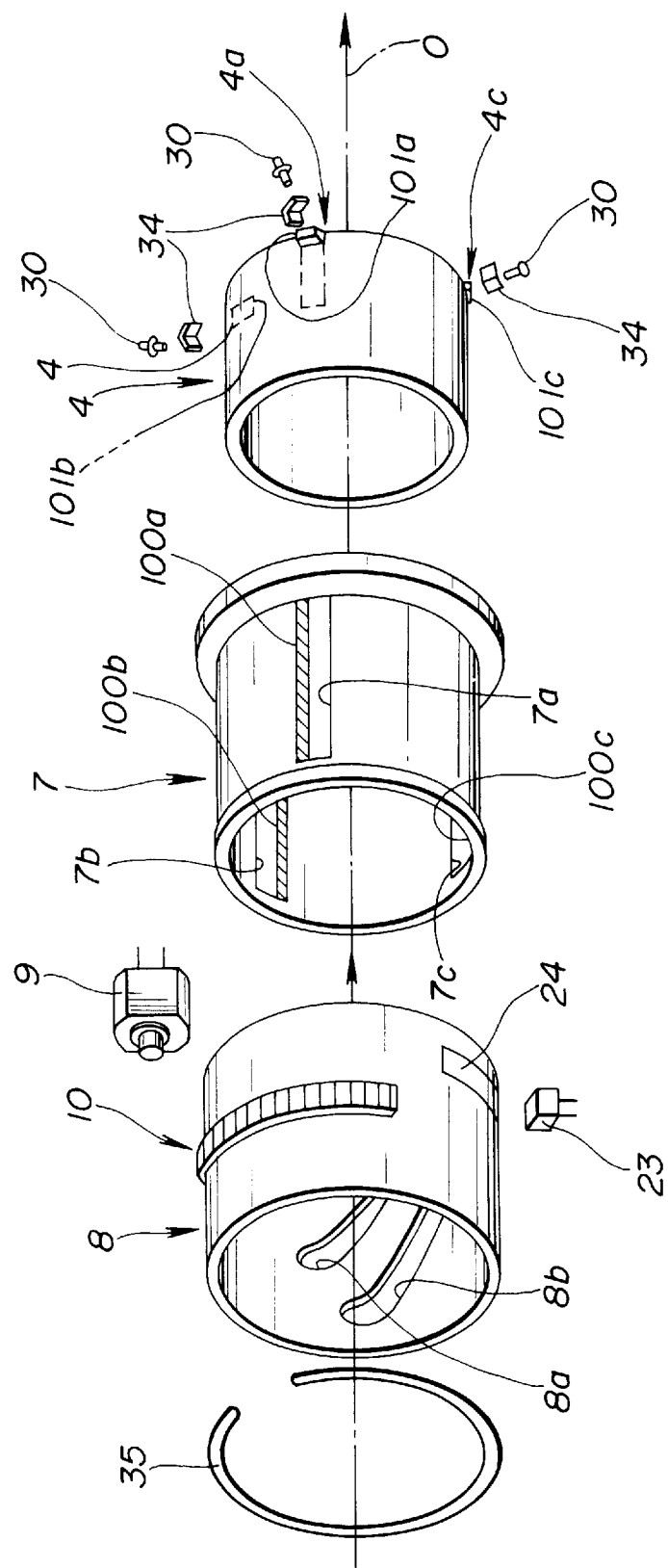
FIG. 1 is an exploded oblique view of a lens barrel in an imaging apparatus of the first embodiment of the present invention.

Referring to the drawings, embodiments of the present invention will be described below.

FIGS. 1 to 5 are views showing the components of an imaging apparatus of the first embodiment of the present invention.

Figure 2:
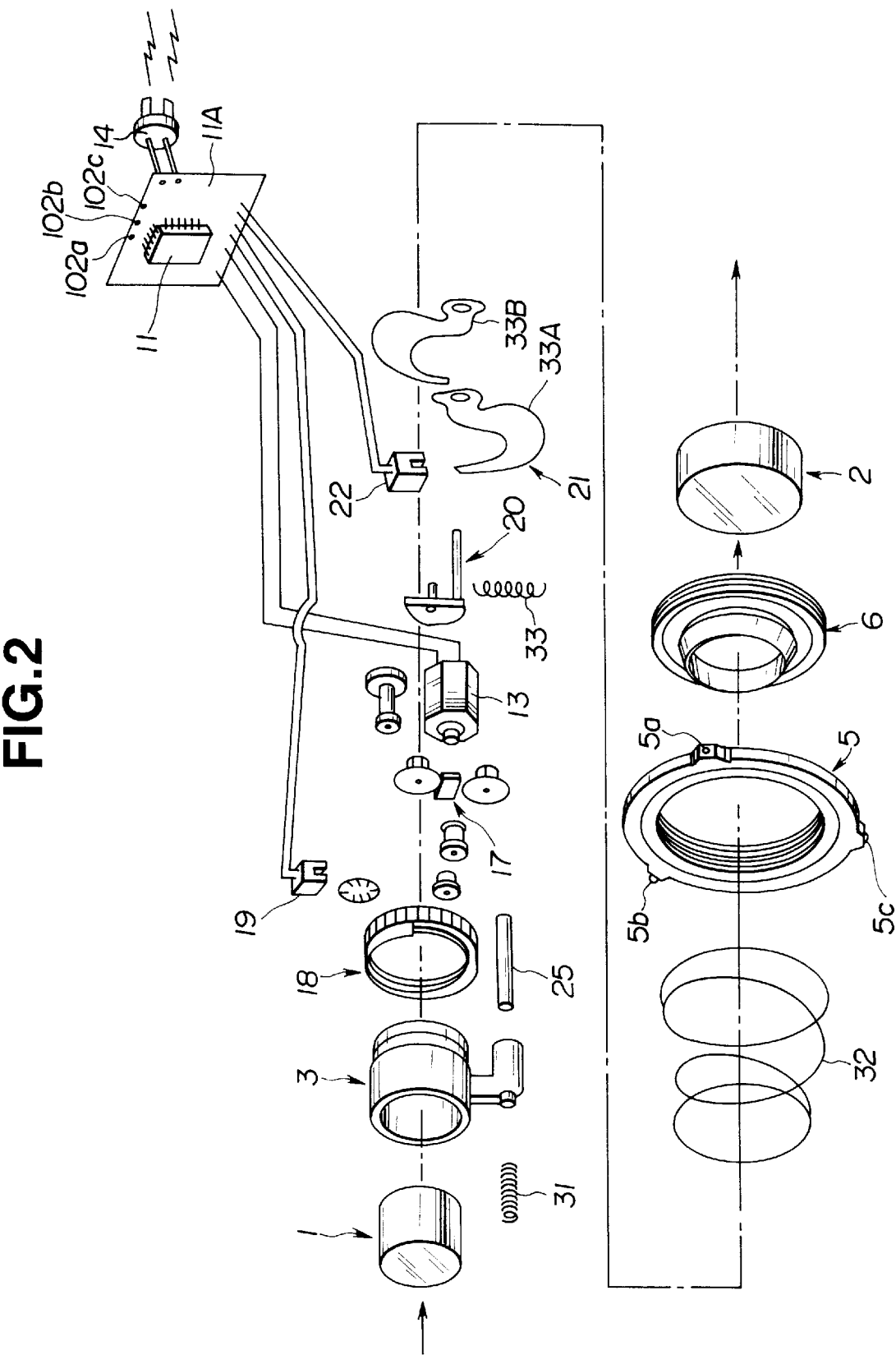
FIG. 2 is an exploded oblique view of the lens barrel in an imaging apparatus of the first embodiment.

FIGS. 1 and 2 are exploded oblique views of a lens barrel in the imaging apparatus.

Figure 3:
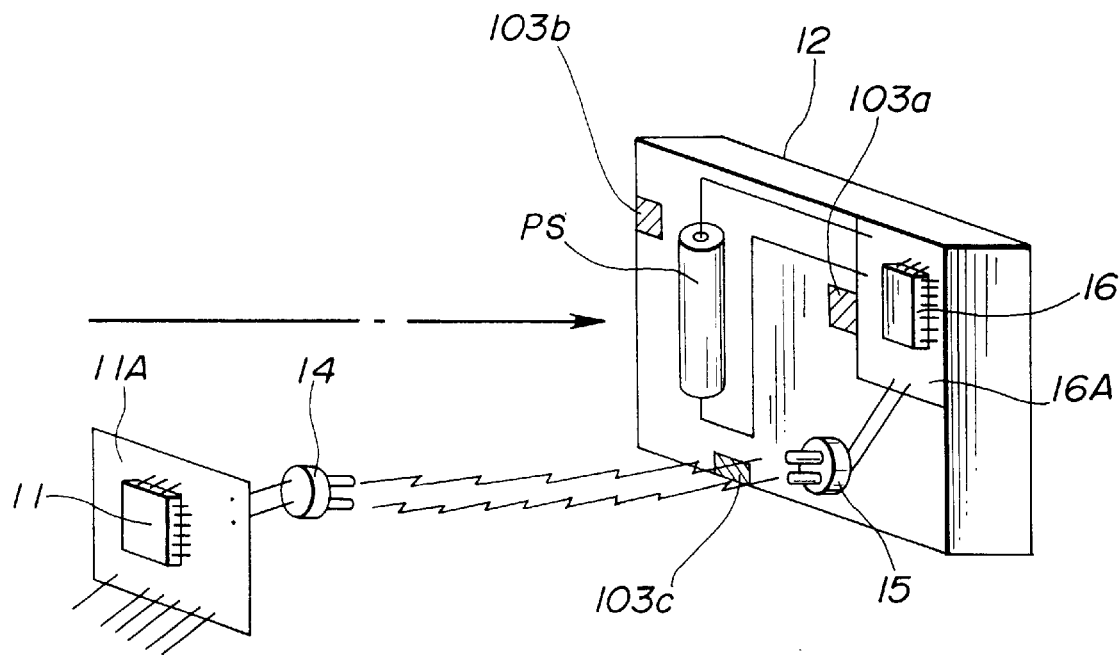
FIG. 3 is an oblique view of a major portion showing engaging portions of the main unit of the imaging apparatus and the lens barrel shown in FIGS. 1 and 2.

FIG. 3 is an oblique view of a major portion showing engaging portions of the main unit of the imaging apparatus and the lens barrel shown in FIGS. 1 and 2.

Figure 4:
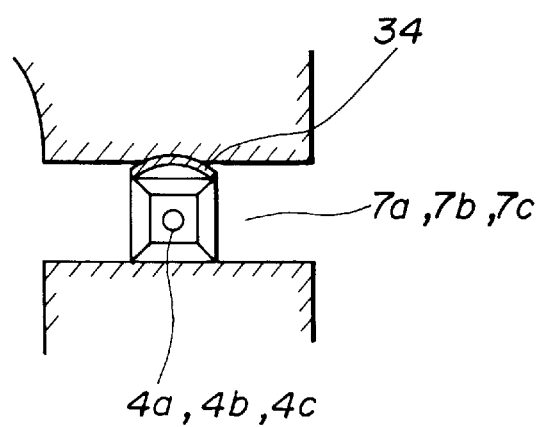
FIG. 4 is an enlarged view of a major portion showing a cam follower of a lens holding frame in the imaging apparatus of the first embodiment.

FIG. 4 is an enlarged view of a major portion showing a cam follower in a lens holding frame in the imaging apparatus.

Figure 5:
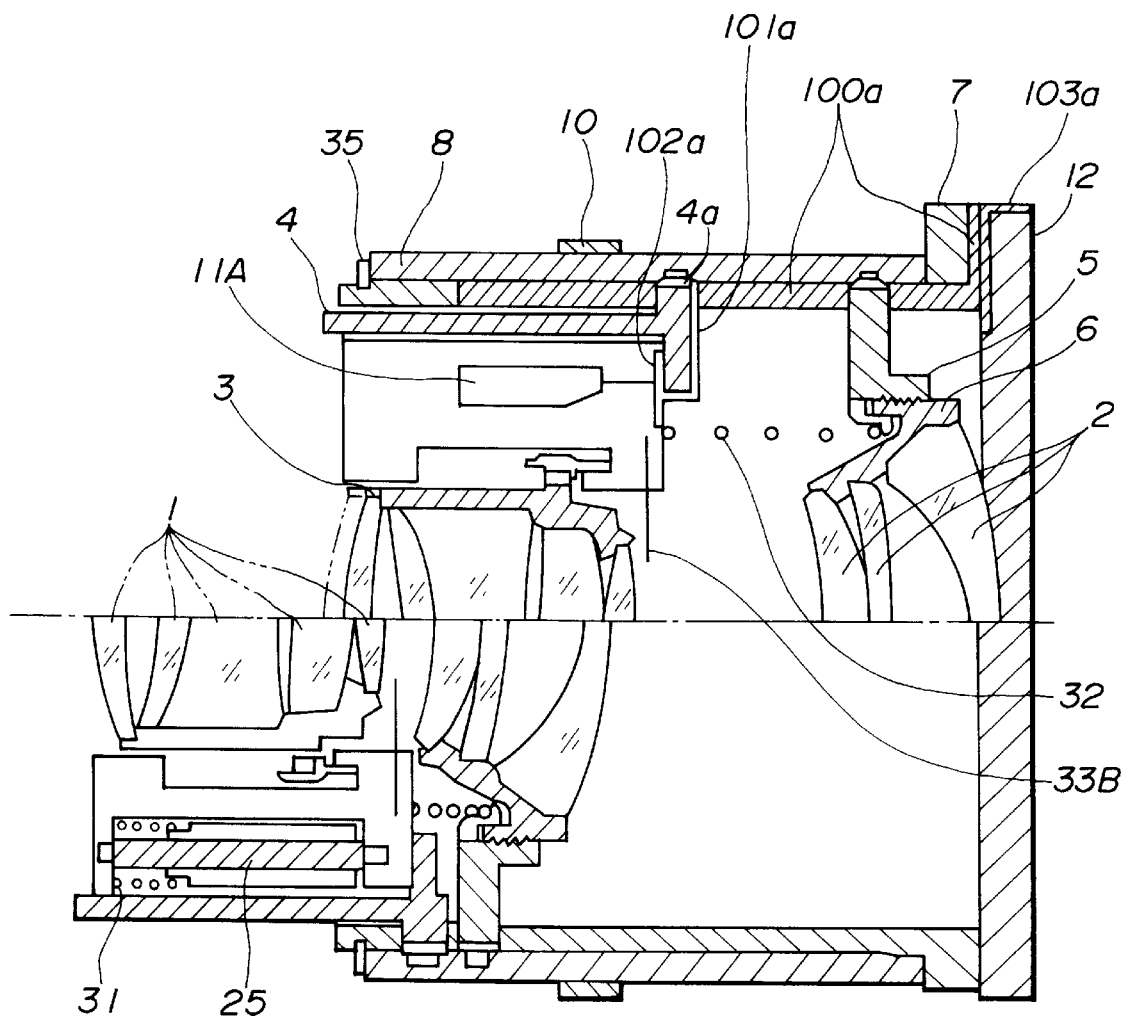
FIG. 5 is a sectional view of a major portion in which the upper section shows a wide-angle state of the imaging apparatus of the first embodiment and the lower section shows a telephotography state thereof.

FIG. 5 is a sectional view of a major portion in which the upper section shows a wide-angle state of the imaging apparatus and the lower section shows a telephotography state thereof.

As shown in FIGS. 1, 2, and 5, the imaging apparatus of this embodiment includes a first group of lenses 1 having a normal function. The first group of lenses 1 is held in a lens holding frame 3 and further in a lens holding frame 4, and can be moved in an optical-axis direction along with a focus operation. A second group of lenses 2 is held in a lens holding frame 6 and further in a lens holding frame 5, and can be moved in the optical-axis direction along with a power variation operation. The lens holding frames 4 and 5 can be moved in the optical-axis direction along with the power variation operation.

Cam followers 4a, 4b, and 4c (See FIG. 1) are formed at three respective positions on the outer circumference of the back end of the lens holding frame 4. Likewise, cam followers 5a, 5b, and 5c are formed at three respective positions on the outer circumference of the back end of the lens holding frame 5. These cam followers 4a, 4b, 4c, 5a, 5b, and 5c are engaged with cam grooves 8a, 8b, and 8c formed at three respective positions on the inner-diameter side of a cam ring 8 coincidentally with the frames. In FIG. 1, the cam groove 8c is omitted from view.

When a zoom driving motor 9 fixed to a main unit of the imaging apparatus is driven and the cam ring 8 is rotated via a zoom lens driving force conveyer 10, the lens holding frame 4 (first group of lenses 1) and lens holding frame 5 (second group of lenses 2) are driven in the optical-axis direction according to the shapes of the cams formed thereon. Thus, a power variation operation is carried out.

The upper section in FIG. 5 shows a wide-angle state, while the lower section therein shows a telephotography state. As illustrated, a locking frame 7 has conductive parts 100a, 100b, and 100c formed along rectilinear guide grooves 7a, 7b, and 7c (See FIG. 1), along which the lens holding frames 4 and 5 slide and thus move in the optical-axis direction, from an end of the locking frame 7.

In FIG. 5, only the conductive part 100a of three conductive parts is shown (the same applies to the other sectional views). The conductive parts 100a, 100b, and 100c are connected to conductive parts 101a, 101b, and 101c extending from an outer sliding side of the lens holding frame 4 to the inner sub CPU 11.

The conductive parts 101a, 101b, and 101c are connected to conductive parts 102a, 102b, and 102c formed on a sub CPU printed-circuit board 11A on which the sub CPU 11 is mounted. Thus, the conductive parts 100a, 100b, and 100c are connected to the sub CPU 11 and fill the role of a signal line.

The conductive parts 100a, 100b, 100c, 101a, 101b, 101c, 102a, 102b, and 102c are formed according to a patterning method using an MID. The details of the method will be described later.

Moreover, the conductive parts 100a, 100b, and 100c extend to a joint side of the locking frame 7 relative to the main unit 12 of the imaging apparatus. When the lens barrel is mounted in the main unit 12 of the imaging apparatus, the conductive parts 100a, 100b, and 100c are joined with conductive parts 103a, 103b, and 103c formed on the main unit 12 of the imaging apparatus. Power is therefore supplied from a power source PS in the main unit 12 of the imaging apparatus to the sub CPU 11 inside the lens holding frame 4 via the conductive parts 100a, 100b, and 100c of the locking frame 7.

Springs 34 are placed at three respective positions at which the cam followers 4a, 4b, and 4c on the lens holding frame 4 are located to slide along the rectilinear guide grooves 7a, 7b, and 7c on the locking frame 7. The cam followers 4a, 4b, and 4c on the lens holding frame 4 are always constrained to abut against both edges of the rectilinear guide grooves 7a, 7b, and 7c on the locking frame 7. Thus, an effect of conduction is improved.

A locking spring 35 is attached to the front end of the locking frame 7, and constrains the cam ring 8 to go beyond the left-hand end of the locking frame 7. The cam followers 4a, 4b, and 4c are provided with pins 30 to be fitted into the cam grooves.

Moreover, the sub CPU 11 includes a mechanism for preventing chattering, or the like so as to improve the effect of conduction. As mentioned above, the conductive parts are arranged in threes on the locking frame 7, lens holding frame 4, main unit 12 of the imaging apparatus, and sub CPU 11. Among the three conductive parts, two parts are used for a supply voltage Vcc, and the remaining one part is used for a ground GND. Since two conductive parts are used for the voltage Vcc, an effect of positive (+) conduction is improved.

As for a camera operation, the zoom lens driving motor 9 is driven with a zoom operation. When the cam ring 8 is rotated via the zoom lens driving force conveyer 10, the lens holding frames 4 and 5 are driven in the optical-axis direction according to the shapes of the cams thereof. At the same time, during a power variation operation, the sliding portions of the locking frame 7 and lens holding frame 4 shift their relative positions while conducting. Thus, power is supplied from the main unit 12 of the imaging apparatus to the sub CPU 11 all the time.

As for the first group of lenses 1, the lens holding frame 3 holding the first group of lenses 1 is supported by an axis 25 of the lens holding frame 4 so that the lens holding frame 3 can be moved in the optical-axis direction. The relative positions of the lens holding frames 3 and 4 are changed, whereby a focus operation is carried out. Moreover, a shutter mechanism 21 is locked unitedly in the lens holding frame 4.

Driving the lens holding frame 3 within the lens holding frame 4 (lens driving for focus) and driving the shutter mechanism 21 (shutter driving for exposure control) are achieved by an actuator 13 locked unitedly in the lens holding frame 4 and a driving force conveying mechanism (including a motive power switching mechanism 17 for switching lens driving and shutter driving) that is not shown in detail.

An optical communication mechanism used to control the actuator 13 is held in the lens holding frame 4, and an optical device 14 is placed therein (See FIGS. 2 and 3). An optical device 15 is placed in the main unit 12 of the imaging apparatus. The optical devices 14 and 15 are located at mutually-opposed positions. The optical devices 14 and 15 are the same as a known optical device employed in a remote controller for a home electric appliance. A distance change deriving from a power variation operation on a level with a zoom lens shift in a camera will not facilitate degradations in quantities of emitted light and in levels of signals.

Figure 13:
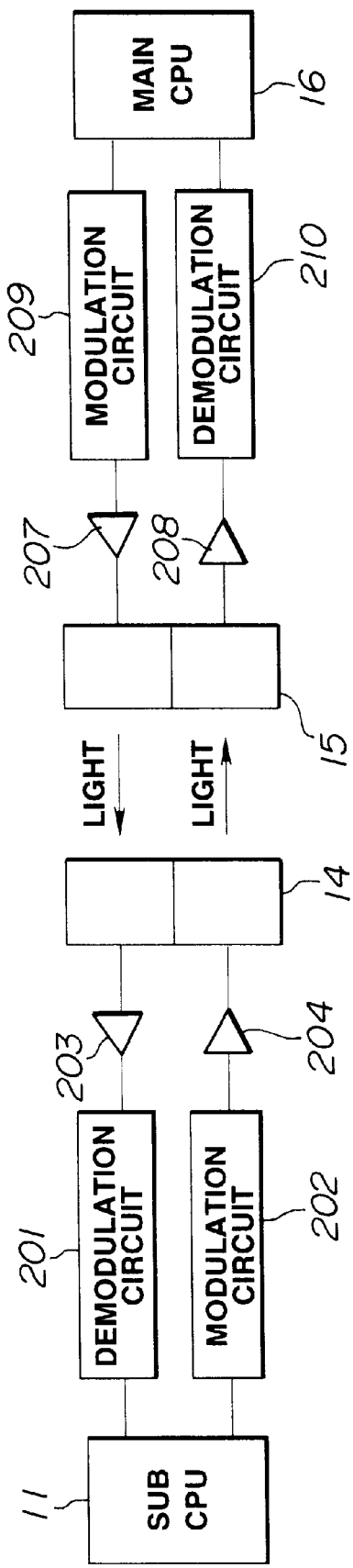
FIG. 13 is a block diagram showing a communication means for a sub CPU and main CPU in the imaging apparatus of the first embodiment.

FIG. 13 is a block diagram showing a communication means used for the sub CPU 11 and main CPU 16. The communication means will be described in line with a signal flow below.

A signal sent from the sub CPU 11 is modulated by a modulation circuit 202 according to a given modulation system, and then input to the optical device 14 via an amplifier 204. A light signal irradiated and transmitted from the optical device 14 is received by the optical device 15, and then separated into a given signal by a separation circuit that is not shown. The resultant signal is then demodulated by a demodulation circuit 210 via an amplifier 208, and then input to the main CPU 16.

By contrast, a signal sent from the main CPU 16 is modulated by a modulation circuit 209 according to the given modulation system, and then input to the optical device 15 via an amplifier 207. A light signal irradiated and transmitted from the optical device 15 is received by the optical device 14, and then separated into a given signal by a separation circuit that is not shown. The resultant signal then passes through an amplifier 203, and is demodulated by a demodulation circuit 201 and input to the sub CPU 11.

In this imaging apparatus, the wavelength of light emanating from the optical devices 14 and 15 is that of far-infrared radiation by which light-sensitive materials will not be sensitized. Modulation of data represented by the light is achieved according to an ASK system shown in FIG. 21A or a PSK system shown in FIG. 21C.

Figure 19:
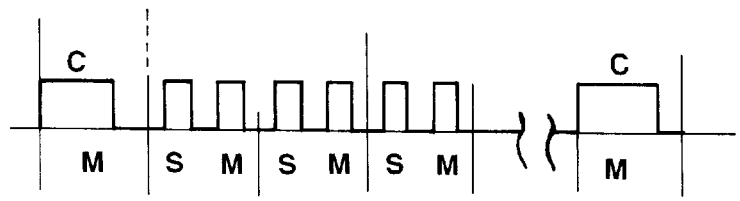
FIG. 19 is a timing chart showing an example of a waveform of a signal used for bi-directional transmission in the imaging apparatus of the first embodiment.
Figure 20:
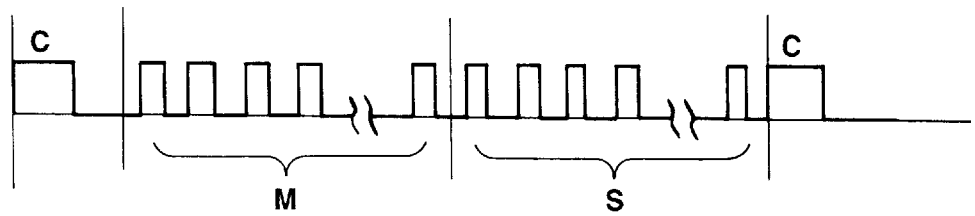
FIG. 20 is a timing chart showing another example of a waveform of a signal used for bi-directional transmission in the imaging apparatus of the first embodiment.

The modulated data is communicated bi-directionally using, for example, a separation circuit as mentioned above (See FIGS. 19 and 20). For example, as shown in FIG. 19, a pair of a signal sent from the main CPU 16 (denoted with M in the drawings) and a signal sent from the sub CPU 11 (denoted with S in the drawings) are transmitted and received in time-sharing fashion during a duration of a clock pulse. Alternatively, as shown in FIG. 20, signals sent from the main CPU 16 are transmitted or received during the first block of the period between clocks, and signals sent from the sub CPU are transmitted or received during the second block thereof.

Returning to FIG. 1, a reflection plate 24 is attached at a given position on the outer circumference of the cam ring 8 coincident with a zoom position. A reflective position sensor 23 located in the main unit of the imaging apparatus is used to detect the reflection plate 24, whereby a reset operation to a wide-angle position is carried out.

The sub CPU 11 that is placed as a signal processor in the lens holding frame 4 controls driving of the actuator 13 on the basis of information sent from the main CPU 16 that is placed as a signal processor in the main unit 12 of the imaging apparatus (See FIG. 2). In other words, driving of the actuator 13 is controlled for the purpose of focus lens driving or shutter driving according to a camera photography sequence on the basis of focus drive information and shutter drive information which are transmitted from the CPU 16 through optical communication.

As shown in FIG. 2, a driving force for the actuator 13 is conveyed from the motive power switching mechanism 17 selectively for the purpose of focus lens driving or shutter driving. Of the driving operations, the focus lens driving operation is carried out by driving the lens holding frame 3 in the optical-axis direction along the axis 25 via a lens driving cam 18. The lens holding frame 3 is constrained to abut on the lens driving cam 18 by means of a spring 31. Position control is achieved by feeding back information on the lens driving cam 18 provided by a position sensor 19 to the sub CPU 11.

Shutter driving is carried out by driving sectors 33A and 33B via a shutter driving lever 20. Position control is achieved by feeding back information on the shutter driving lever 20 provided by a position sensor 22 to the sub CPU 11.

The main CPU 16 lying in the main unit 12 of the imaging apparatus and serving as a signal processor computes focus lens drive information and shutter drive information on the basis of information supplied from a range finding sensor, photometry sensor, and various mode input switches (for example, strobe flashlight information) which are located in the main unit 12 of the imaging apparatus. The main CPU 16 transmits a signal to the sub CPU 11 in the lens holding frame 4 according to a camera photography sequence.

The main CPU 16 not only controls the aforesaid operations but also controls strobe flashing, zoom lens driving, film winding and rewinding, displaying, and the like.

Now, the aforesaid patterning method using an MID (molded interconnection device) will be described.

An art of plating the surface of a member made of plastic or the like is generally adopted. For example, as far as computers are concerned, the inside of a casing part is plated in order to improve the effect of a shield. Moreover, a metallic luster is applied to the surfaces or the like of operation button parts of an audio equipment in order to improve the effect of a design.

In these cases, the front sides of parts are plated. An MID is a means for creating a circuit pattern on the surfaces of parts. A method of creating circuits is generally the same as a process of creating a circuit pattern which is adopted for electrical rigid printed-circuit boards. A difference lies in an underlying art: since a part is injection-molded and has a solid shape, three-dimensional circuitry is feasible; and therefore a multi-function compact electronic part having a housing or chassis thereof unitedly provided with a circuit through hole, a connector part support, and other functions can be materialized.

As mentioned above, according to the imaging apparatus of the first embodiment, since power supply from the main unit of the imaging apparatus to the lens holding frames is achieved through the electric connection means using a mechanical member, a flexible printed-circuit board used for electric connections becomes unnecessary. Spaces can therefore be used effectively, thus realizing a compact design of the lens barrel and an improvement of optical performance.

Moreover, the information transmission means used for the main unit of the imaging apparatus and the lens holding frames transmits a signal using the mechanism member that supplies power from the main unit of the imaging apparatus to the lens holding frame. Electric connections dedicated to information transmission for range finding information, photometry information, and the like become unnecessary.

Next, the second embodiment of the present invention will be described.

FIGS. 6 to 10 are views showing the components of an imaging apparatus of the second embodiment of the present invention.

Figure 6:
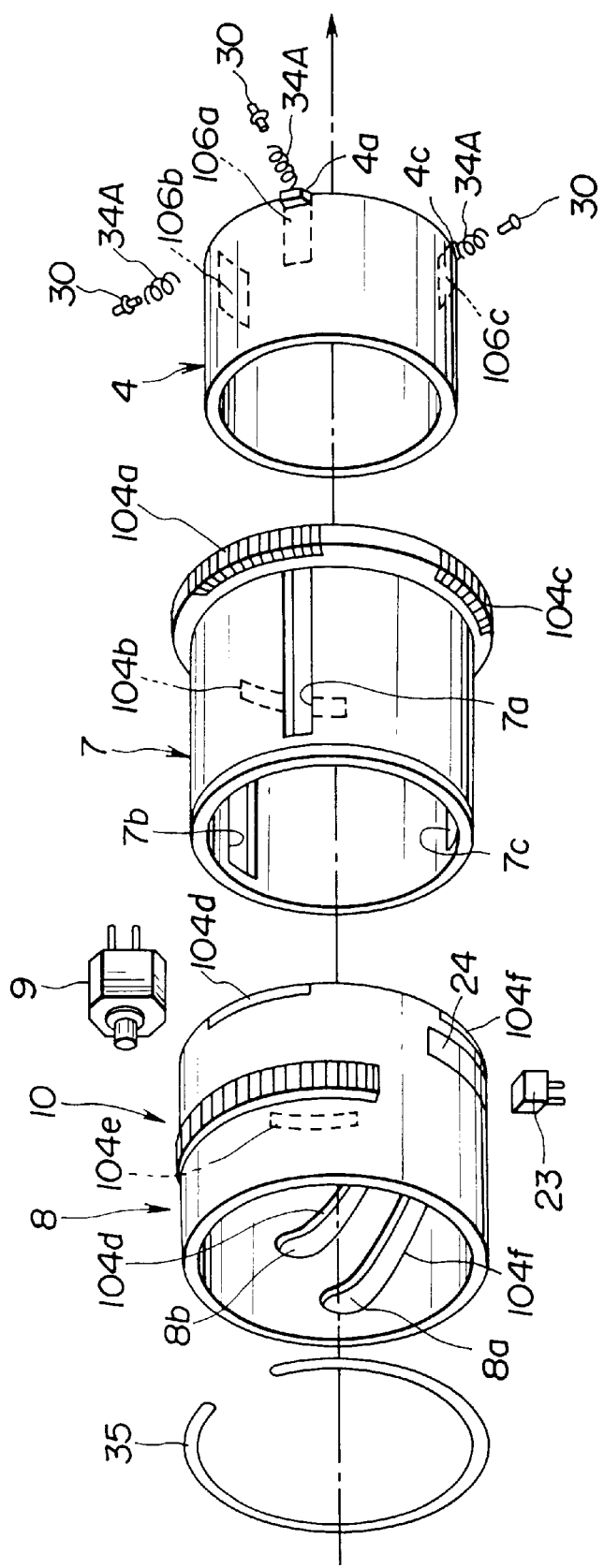
FIG. 6 is an exploded oblique view of a lens barrel in an imaging apparatus of the second embodiment of the present invention.
Figure 7:
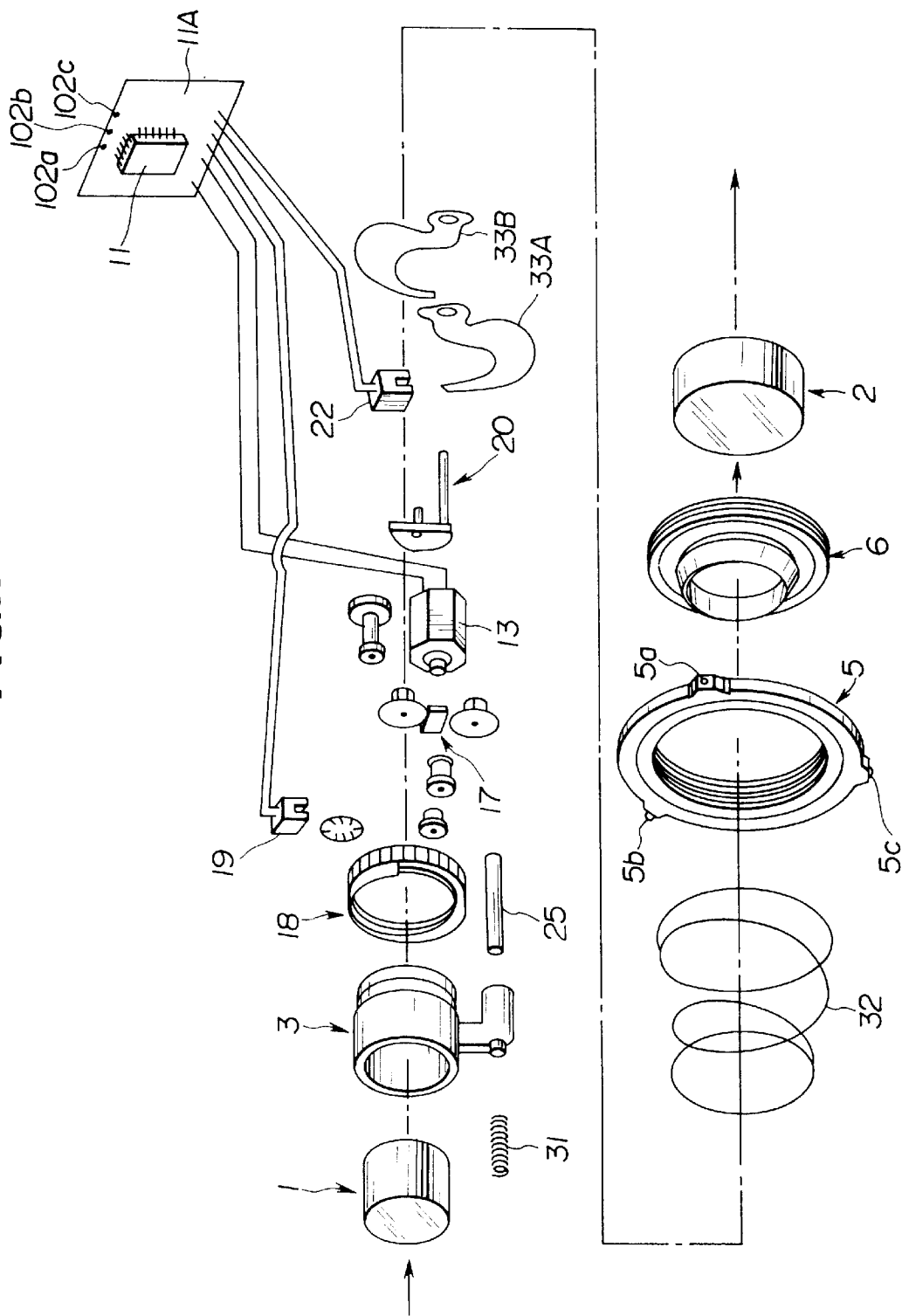
FIG. 7 is an exploded oblique view of the lens barrel in the imaging apparatus of the second embodiment.

FIGS. 6 and 7 are exploded oblique views of a lens barrel in the imaging apparatus.

Figure 8:
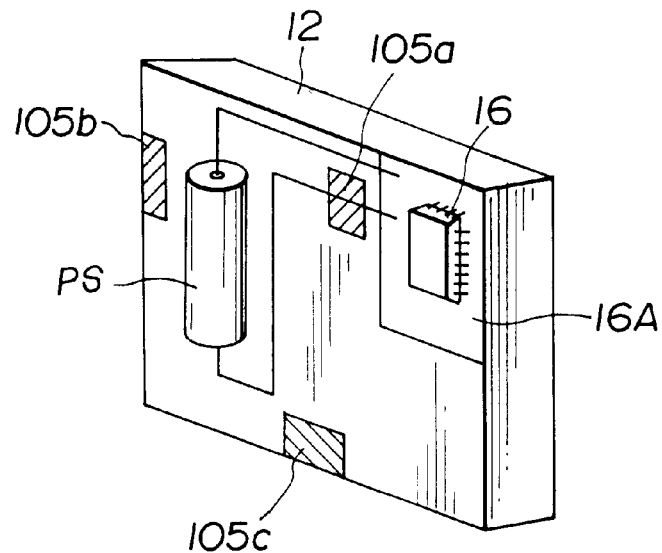
FIG. 8 is an oblique view of a major portion showing engaging portions of the main unit of the imaging apparatus of the second embodiment and the lens barrel shown in FIGS. 6 and 7.

FIG. 8 is an oblique view of a major portion showing engaging portions of the imaging apparatus with the lens barrel shown in FIGS. 6 and 7.

Figure 9:
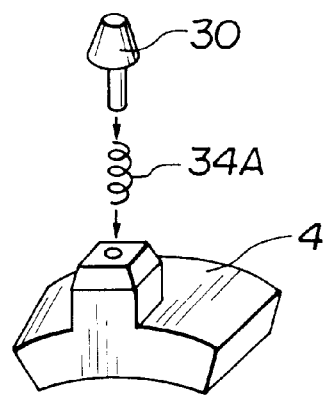
FIG. 9 is an enlarged view of a major portion showing a cam follower of a lens holding frame in the imaging apparatus of the second embodiment.

FIG. 9 is an enlarged view of a major portion showing a cam follower on a lens holding frame in the imaging apparatus.

Figure 10:
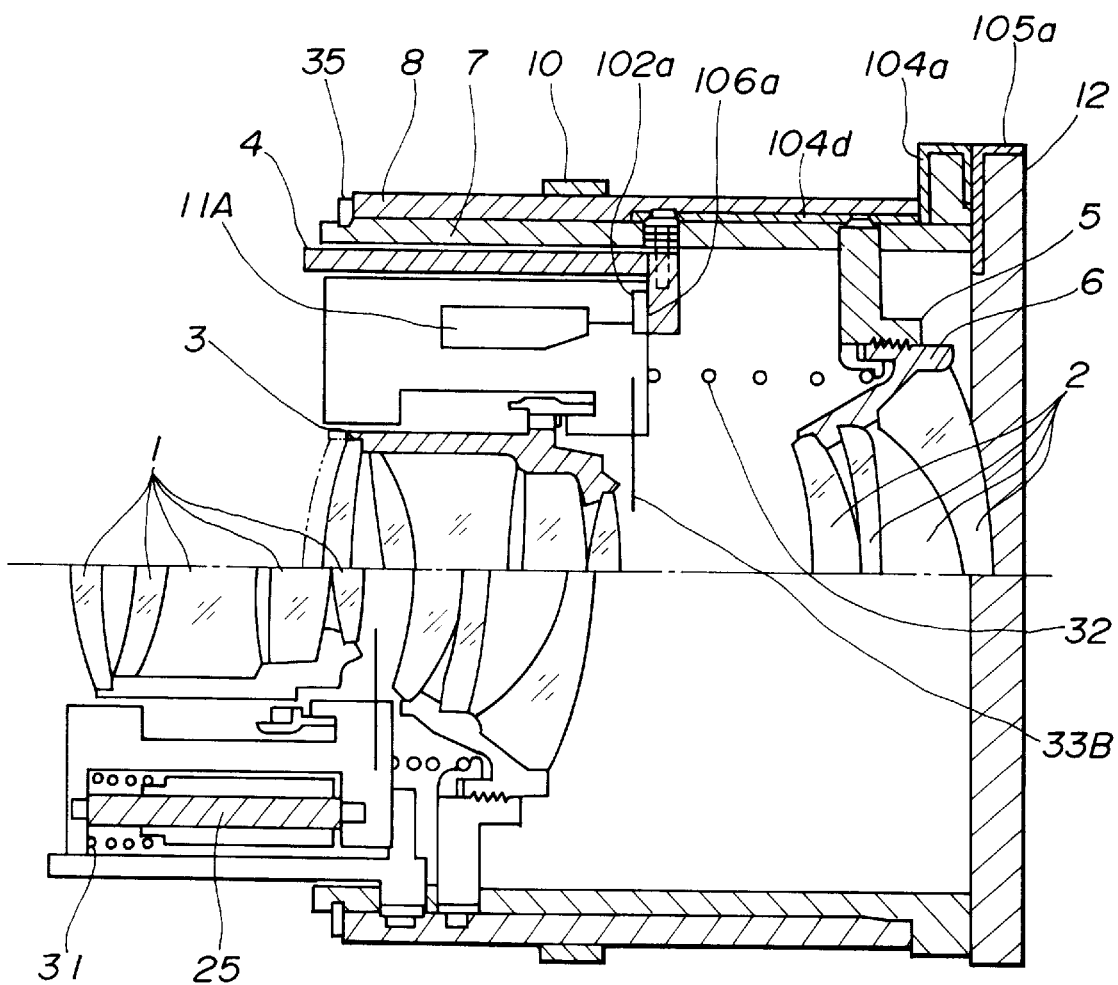
FIG. 10 is a sectional view of a major portion in which the upper section shows a wide-angle state of the imaging apparatus of the second embodiment and the lower section shows a telephotography state thereof.

FIG. 10 is a sectional view of a major portion in which the upper section shows a wide-angle state of the imaging apparatus and the lower section shows a telephotography state thereof.

As shown in FIGS. 6, 7, and 10, this imaging apparatus includes a first group of lenses 1 having the normal function similar to the one in the first embodiment. The first group of lenses 1 is held in a lens holding frame 3 and further in a lens holding frame 4, and can be moved in an optical-axis direction along with a focus operation.

A second group of lenses 2 is held in a lens holding frame 6 and further in a lens holding frame 5, and can be moved in the optical-axis direction along with a power variation operation. Moreover, the lens holding frames 4 and 5 can be moved in the optical-axis direction along with the power variation operation.

The lens holding frames 4 and 5 each have, similar to those in the first embodiment, three cam followers on the outer circumference thereof (cam followers 4a, 4b, 5c, 5a, 5b, and 5c). The cam followers are engaged with three cam grooves formed in an inner-diameter side of a cam ring 8 coincidentally with the respective frames.

When a zoom lens driving motor 9 locked in the main unit 12 of the imaging apparatus is driven and the cam ring 8 is rotated via a zoom lens driving force conveyer 10, the lens holding frame 4 (first group of lenses 1) and lens holding frame 5 (second group of lenses 2) are driven in the optical-axis direction according to the respective shapes of the cams thereof. A power variation operation is thus carried out.

Three conductive parts 104a, 104b, and 104c are formed in a radial direction on an end of a locking frame 7 so that the conductive parts can each cover a range equivalent to an angle of rotation of the cam ring 8. Conductive parts 104d, 104e, and 104f are formed so that they extend from positions on the cam ring 8 opposed to the conductive parts 104a, 104b, and 104c to the cam grooves formed inside the cam ring 8.

Pins 30 to be fitted into the cam grooves are conductors. Conductive parts 106a, 106b, and 106c are formed according to the aforesaid patterning method using an MID so that they will extend from pin insertion points on the lens holding frame 4 toward the inside of the lens holding frame 4. The conductive parts reach conductive parts 102a, 102b, and 102c of a sub CPU 11 incorporated in the lens holding frame 4.

In other words, the conductive parts 106a, 106b, and 106c are connected to the conductive parts 102a, 102b, and 102c formed on a sub CPU printed-circuit board 11a on which the sub CPU 11 is mounted. The conductive parts 104a, 104b, and 104c are therefore connected to the sub CPU 11 and thus fill the role of a signal line.

When the lens barrel is attached to the main unit 12 of the imaging apparatus, the conductive parts 104a, 104b, and 104c of the locking frame 7 are joined with conductive parts 105a, 105b, and 105c formed on the main unit 12 of the imaging apparatus. Power is therefore supplied from a power source (PS) 13 in the main unit 12 of the imaging apparatus to the sub CPU 11 inside the lens holding frame 4 by way of the conductive parts 104a, 104b, and 104c of the locking frame 7.

Thus, power for the sub CPU 11 is supplied from the main unit 12 of the imaging apparatus through the conductive parts 104a, 104b, and 104c of the locking frame 7, the conductive parts 104d, 104e, and 104f of the cam ring 8, the conductor pins 30, and the conductive parts 106a, 106b, and 106c of the lens holding frame 4 to the sub CPU 11 incorporated in the lens holding frame 4.

In an effort to improve an effect of conduction exerted by the locking frame 7 and cam ring 8, a spring 35 is used to constrain the cam ring 8 to abut on the locking frame 7. Furthermore, three springs 34A (See FIG. 9) are interposed between the lens holding frame 4 and conductor pins 30. The conductor pins 30 attached to the lens holding frame 4 are constrained to abut on the cam grooves on the cam ring 8. The effect of conduction is thus improved.

Moreover, the sub CPU 11 includes a mechanism for preventing chattering so as to improve the effect of conduction. As mentioned above, the conductive parts are arranged in threes on the locking frame 7, lens holding frame 4, main unit 12 of the imaging apparatus, and sub CPU 11. Among the three conductive parts, two conductive parts are used for a supply voltage Vcc and the remaining one is used for a ground GND. Thus, since two conductive parts are used for the supply voltage Vcc, an effect of positive (+) conduction is improved.

As described so far, in the imaging apparatus of the second embodiment, when the zoom lens driving motor 9 is driven with a zoom operation and the cam ring 8 is rotated via the zoom lens driving force conveyer 10, the lens holding frame 4 and lens holding frame 5 are driven in the optical-axis direction according to the shapes of the cams thereof. At the same time, the sliding portions of the locking frame 7, cam ring 8, and lens holding frame 4 shift while conducting during a power variation operation. Thus, power is supplied from the main unit of the imaging apparatus to the sub CPU 11 all the time.

As for the first group of lenses 1, the lens holding frame 3 holding the first group of lenses 1 is supported by an axis 25 of the lens holding frame 4 so that the lens holding frame 3 can be moved in the optical-axis direction. The lens holding frames 3 and 4 change their positions thereof relatively, whereby a focus operation is carried out. Moreover, a shutter mechanism 21 is locked unitedly in the lens holding frame 4. Driving the lens holding frame 3 (lens driving for focus) in the lens holding frame 4 and driving the shutter mechanism 21 (shutter driving for exposure control) therein are achieved by an actuator 13 and a driving force conveying mechanism (including a motive power switching mechanism 17 for switching lens driving and shutter driving) that is not shown, which are also locked unitedly in the lens holding frame 4.

Figure 15:
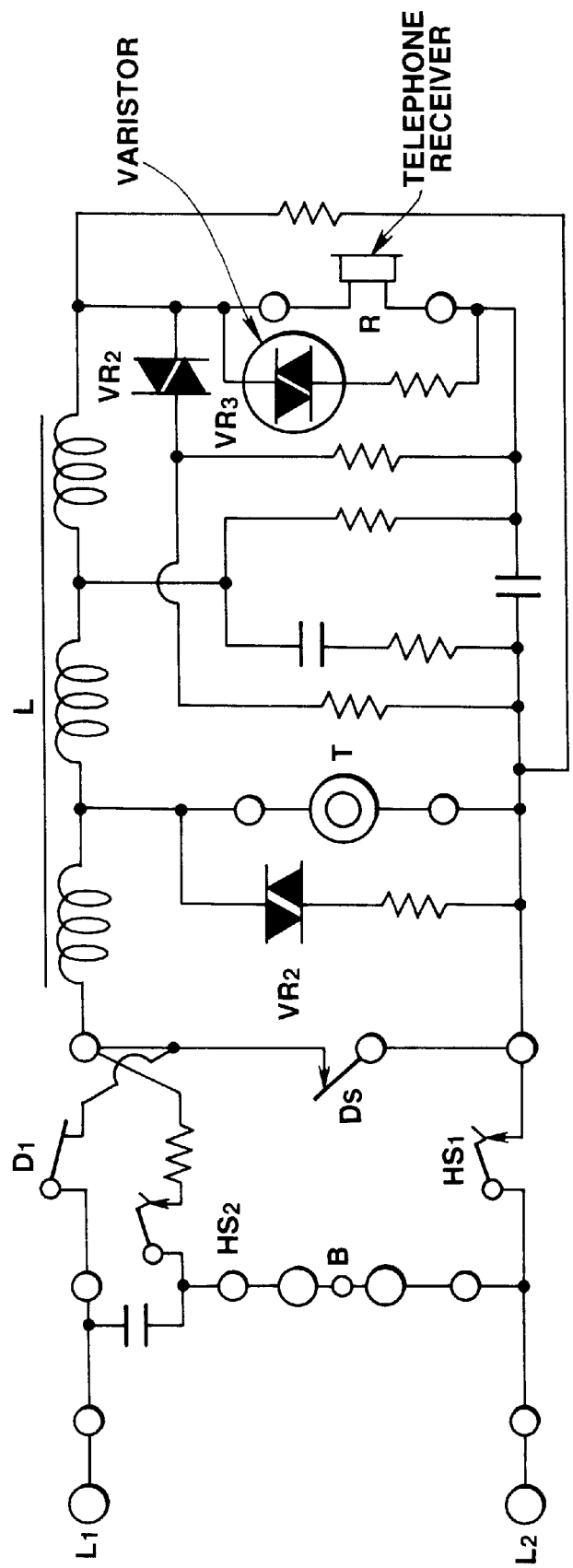
FIG. 15 is an internal circuit diagram of a home black telephone.

In the imaging unit of the second embodiment, in the lens holding frame 4, wire communication is used as a communication means for controlling the actuator. The basic configuration of the communication means is devised with reference to the internal circuit diagram of a home telephone shown in FIG. 15. The configuration will be described below.

Figure 14:
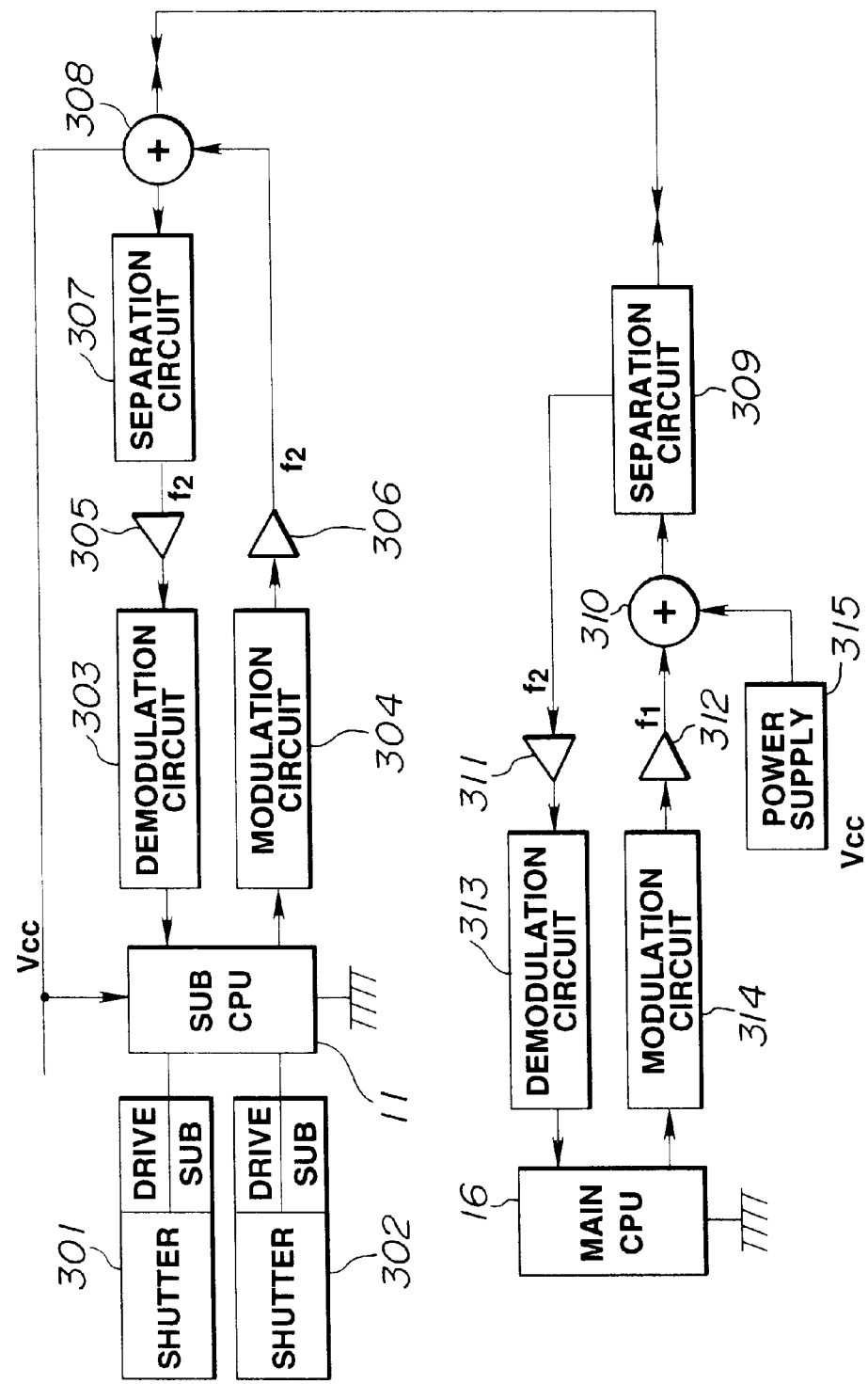
FIG. 14 is a block diagram showing a communication means for a sub CPU and main CPU in the imaging apparatus of the second embodiment.

FIG. 14 is a block diagram showing the configuration of the communication means in the imaging unit of the second embodiment. The communication means will be described in line with a signal flow below.

As illustrated, signals used for communications are transmitted on a line used to supply electric power from the power source 13 to the sub CPU 11 in order to achieve bi-directional transmission. A signal sent from the sub CPU 11 is modulated by a modulation circuit 304 according to a given modulation system, amplified by an amplifier 306, and then input to a synthesization circuit 308. The signal synthesized with the supply voltage Vcc by the synthesization circuit 308 is separated from the voltage Vcc by a separation circuit 309 on the side of a main CPU 16, demodulated by a demodulation circuit 313 after passing through an amplifier 311, and then input to the main CPU 16.

By contrast, a signal sent from the main CPU 16 is modulated by a modulation circuit 314 according to the given modulation system, amplified by an amplifier 312, and then input to a synthesization circuit 310. The signal synthesized with the voltage Vcc supplied from the power source 315 by the synthesization circuit 310 is separated from the voltage Vcc by a separation circuit 307 on the side of the sub CPU 11, demodulated by a demodulation circuit 303 after passing through an amplifier 305, and then input to the sub CPU 11. The sub CPU 11 controls a shutter mechanism 301 and focus mechanism 302 on the basis of information sent from the main CPU 16.

Figure 21A:
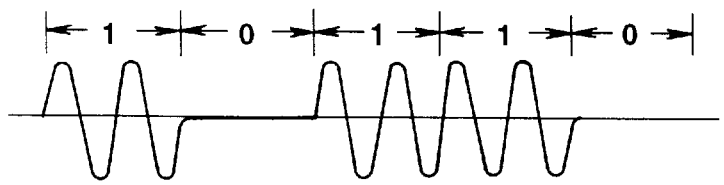
FIG. 21A is a diagram showing an example of an ASK data modulation system in the imaging apparatus of the first embodiment.
Figure 21B:
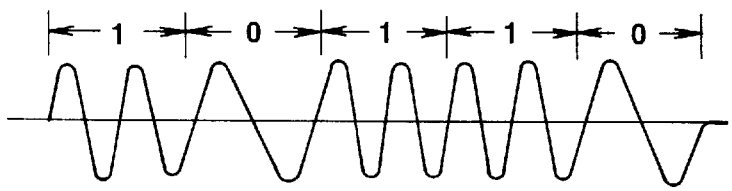
FIG. 21B is a diagram showing an example of an FSK data modulation system in the imaging apparatus of the first embodiment.
Figure 21C:
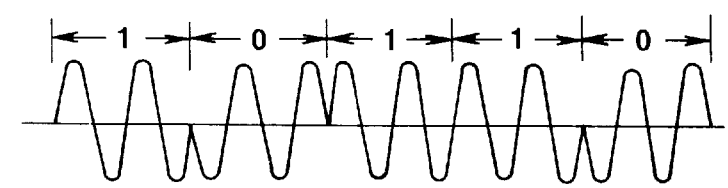
FIG. 21C is a diagram showing an example of a PSK modulation system in the imaging apparatus of the first embodiment.

In the imaging apparatus of the second embodiment, bi-directional transmission is achieved using data modulation of either an ASK system shown in FIG. 21A or a PSK system shown in FIG. 21C.

A reset operation to a wide-angle position is carried out in the same manner as that in the first embodiment when a reflective position sensor 23 located in the main unit of the imaging apparatus is, as shown in FIG. 6, used to detect a reflection plate 24 located at a given position on the outer circumferential surface of the cam ring coincident with a zoom position.

The signal processor (sub CPU) 11 incorporated in the lens holding frame 4 controls driving of the actuator 13 on the basis of focus drive information and shutter drive information which are transmitted from the signal processor (main CPU) 16 located in the main unit 12 of the imaging apparatus using wire communication, so that focus lens driving and shutter driving can be achieved according to a camera photography sequence. At this time, the driving force for the actuator 13 is conveyed selectively for the purpose of focus lens driving or shutter driving by means of the motive power switching mechanism 17.

A focus operation is carried out by driving the lens holding frame 3 in the optical-axis direction along the axis 25 via a lens driving cam 18. The lens holding frame 3 is constrained to abut on the lens driving cam 18 all the time by means of a spring 31. Position control is achieved by feeding back information on the lens driving cam 18 provided by a position sensor 19 to the sub CPU 11.

By the way, shutter driving is achieved by driving sectors 33A and 33B via a shutter driving lever 20. Controlling the positions of the sectors is achieved by feeding back information on the shutter driving lever 20 provided by a position sensor 22 to the sub CPU 11.

The main CPU 16 incorporated in the main unit 12 of the imaging apparatus computes focus lens drive information and shutter drive information on the basis of information provided by a range finding sensor, photometry sensor, and various mode input switches (strobe flash information and the like) which are mounted in the main unit 12 of the imaging apparatus. The main CPU 16 then transmits a signal to the sub CPU 11 incorporated in the lens holding frame 4 according to a camera photography sequence. The main CPU 16 is responsible not only for the aforesaid control but also for the control of strobe flashing, zoom lens driving, film winding and rewinding, and displaying.

As mentioned above, the imaging apparatus of the second embodiment provides the same advantages as the imaging apparatus of the first embodiment.

Next, the third embodiment of the present invention will be described.

Figure 11:
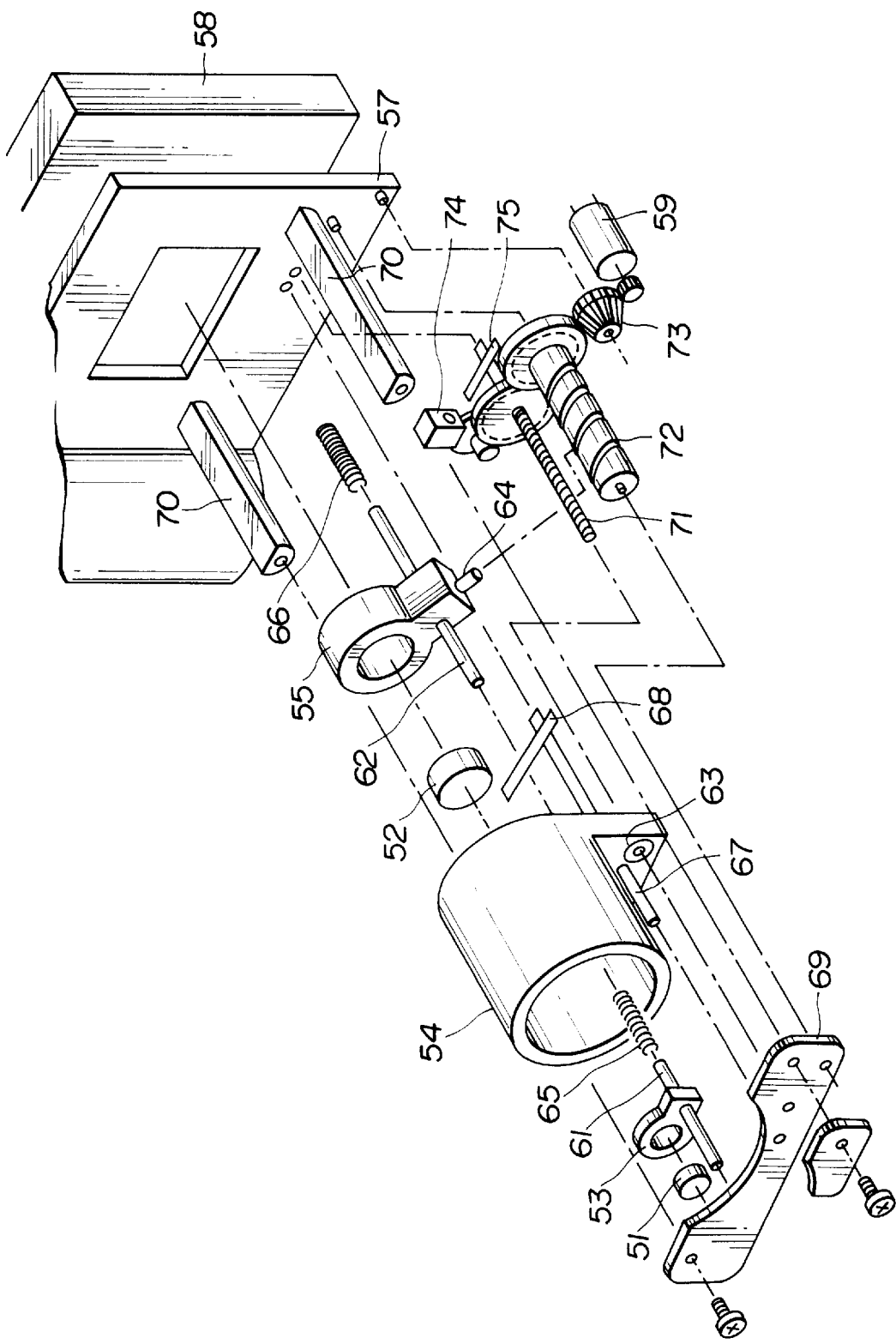
FIG. 11 is an exploded oblique view of a major portion showing the principal components of an imaging apparatus of the third embodiment of the present invention.

FIG. 11 is an exploded oblique view of a major portion showing the principal components of an imaging apparatus of the third embodiment.

As shown in FIG. 11, the third embodiment includes a first group of lenses 51 having a normal function. The first group of lenses 51 is held in a lens holding frame 53 and further held in a lens holding frame 54. The first group of lenses 51 is movable in an optical-axis direction along an axis 61 with a focus operation. Likewise, a second group of lenses 52 is held in a lens holding frame 55 and movable in the optical-axis direction along an axis 62 with a power variation operation.

The lens holding frame 54 is movable in the optical-axis direction along an axis 67. A thread 63 is formed in an outer circumferential part of the back end of the lens holding frame 54. A feed screw 71 is meshed with the thread 63. The lens holding frame 54 moves in the optical-axis direction along the axis 67 with the rotation of the feed screw 71.

A pin portion 64 is formed on the outer circumference of the lens holding frame 55, and the tip of the pin portion 64 is fitted into a groove on a cam screw 72. The lens holding frame 55 moves in the optical-axis direction by the pin portion 64 moving along the groove on the cam screw 72 with the rotation of the cam screw 72.

The cam screw 72 and feed screw 71 are positioned between a locking frame 57 and a cover plate 69 and supported by them. Gears meshing with a zoom lens driving force conveyer 73 that conveys a driving force from a zoom lens driving motor 59 fixed to a main unit 58 of the imaging apparatus are located at the proximal ends of the cam screw 72 and feed screw 71 respectively.

Owing to the foregoing arrangement, when the zoom lens driving motor 59 is driven, since a driving force is conveyed to the cam screw 72 via the zoom lens driving force conveyer 73, the cam screw 72 rotates. This causes the lens holding frame 55 (second group of lenses 52) engaging with the cam groove on the cam screw 72 to be driven in the optical-axis direction. Since the feed screw 71 interlocked with the cam screw 72 rotates, the lens holding frame 54 (first group of lenses 51) is also driven in the optical-axis direction. Thus, a power variation operation is carried out.

Moreover, the rotation of the gear located at the proximal end of the feed screw 71 is detected by a position sensor 74. Consequently, the rotational position of the feed screw 71, that is, the position of the lens holding frame 54 can be detected.

Incidentally, the axis 67 and feed screw 71 are made of a conducting material. The cover plate 69 is screwed firmly to two columns 70 extending from the locking frame 57.

Figure 12:
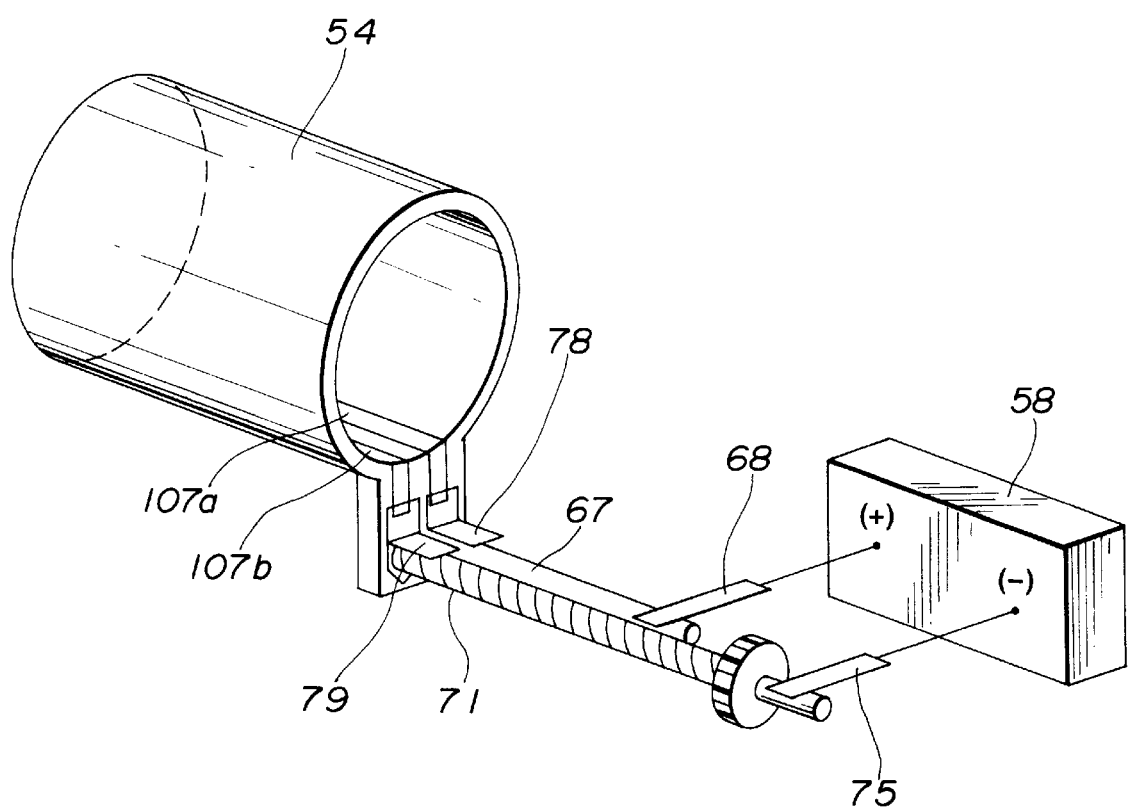
FIG. 12 is an exploded oblique view of a major portion showing an electrically connected state in the imaging apparatus of the third embodiment.

FIG. 12 is an exploded oblique view of a major portion showing an electrically-connected state in the imaging apparatus of the third embodiment.

As illustrated, for supplying power from the main unit 58 of the imaging apparatus to a sub CPU 11, which is the same as the one in the first embodiment, incorporated in the lens holding frame 54, either the positive (+) electrode or negative (−) electrode (in this embodiment, the negative electrode) is connected from the main unit 58 of the imaging apparatus through a slidable part of a contact strip 75, the feed screw 71, a slidable part of a contact strip 79 of the lens holding frame 54, and a conductive part 107b formed in the lens holding frame 54 according to the MID method to the sub CPU 11.

Likewise, the other electrode (the positive electrode in this embodiment) is connected from the imaging apparatus 58 through a slidable part of a contact strip 68, the axis 67, a slidable part of a contact strip 78 of the lens holding frame 54, and a conductive part 107a formed in the lens holding frame 54 according to the MID method to the sub CPU 11.

In the imaging apparatus of the third embodiment having the foregoing structure, the zoom lens driving motor 59 fixed to the imaging apparatus 58 is driven according to a signal sent from the position sensor 74. When the cam screw 72 and feed screw 71 are rotated via the zoom lens driving conveyer 73, the lens holding frame 54 moves in the optical-axis direction. Accordingly, the contact strips 79 and 78 slidable on the axis 67 and feed screw 71 respectively move in the optical-axis direction. The electric connections of the feed screw 71 and axis 67 are retained. Power can therefore be supplied from the main unit 58 of the imaging apparatus through the conductive part in the lens holding frame 54 to the sub CPU 11.

Incidentally, the contact strips 75, 68, 79, and 78 are formed with elastic conducting members made of, for example, phosphor bronze, and constrained to abut on the feed screw 71 and axis 67 all the time. This results in the improved effect of conduction. The sub CPU 11 includes a mechanism or the like for preventing chattering for the purpose of improving the effect of conduction.

In the imaging apparatus of this embodiment, a focus operation and shutter operation are identical to those in the first or second embodiment. The description of the operations will therefore be omitted.

In the imaging apparatus of the third embodiment, radio-communication is used to control the actuator in the lens holding frame 54.

Figure 16:
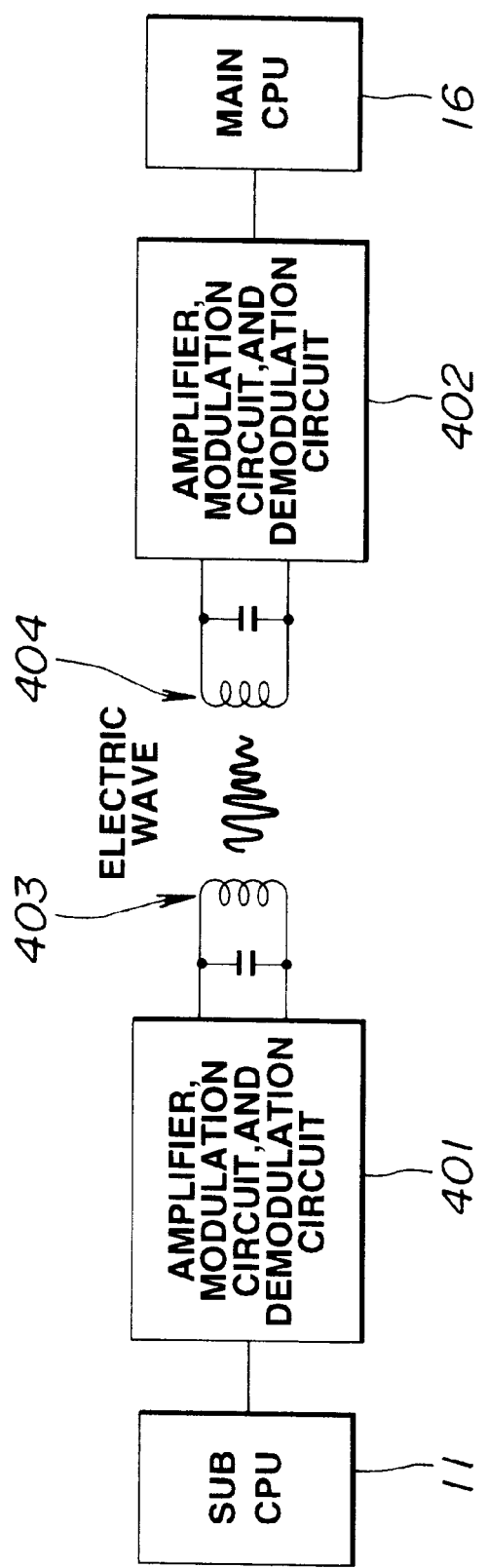
FIG. 16 is a block circuit diagram showing the configuration of a communication means in the imaging apparatus of the third embodiment.

FIG. 16 is a block circuit diagram showing the configuration of a communication means in the imaging apparatus of the third embodiment. The communication means will be described in line with a signal flow below.

As illustrated, a signal sent from the sub CPU 11 incorporated in the lens holding frame 54 passes through an amplifier, modulation circuit, and demodulation circuit 401, and is then input or output in the form of an electromagnetic wave to or from a transmission/reception circuit 403 formed with a coil or the like. Likewise, a transmission/reception circuit 404 formed with a coil or the like is placed in the main unit 58 of the imaging apparatus, and transmits or receives a signal to or from the transmission/reception circuit 403 by radio. A signal sent from the transmission/reception circuit 404 is input to the main CPU 16 via an amplifier, modulation circuit, and demodulation circuit 402.

In this embodiment, since communication is carried out by radio, the input/output blocks of the lens holding frame 54 and the main unit 58 of the imaging apparatus, that is, the transmission/reception circuits 403 and 404 need not have the positional relationship that they are opposed to each other.

Furthermore, in this embodiment, bi-directional transmission is achieved using data modulation of any of the ASK system shown in FIG. 21A, the FSK system shown in FIG. 23B, and the PSK system shown in FIG. 21C.

Control of a camera through communications is identical to that in the first embodiment. The description of the control will therefore be omitted.

As mentioned above, the imaging apparatus of the third embodiment provides the same advantages as the imaging apparatus of the first embodiment.

Next, the fourth embodiment of the present invention will be described.

Figure 18:
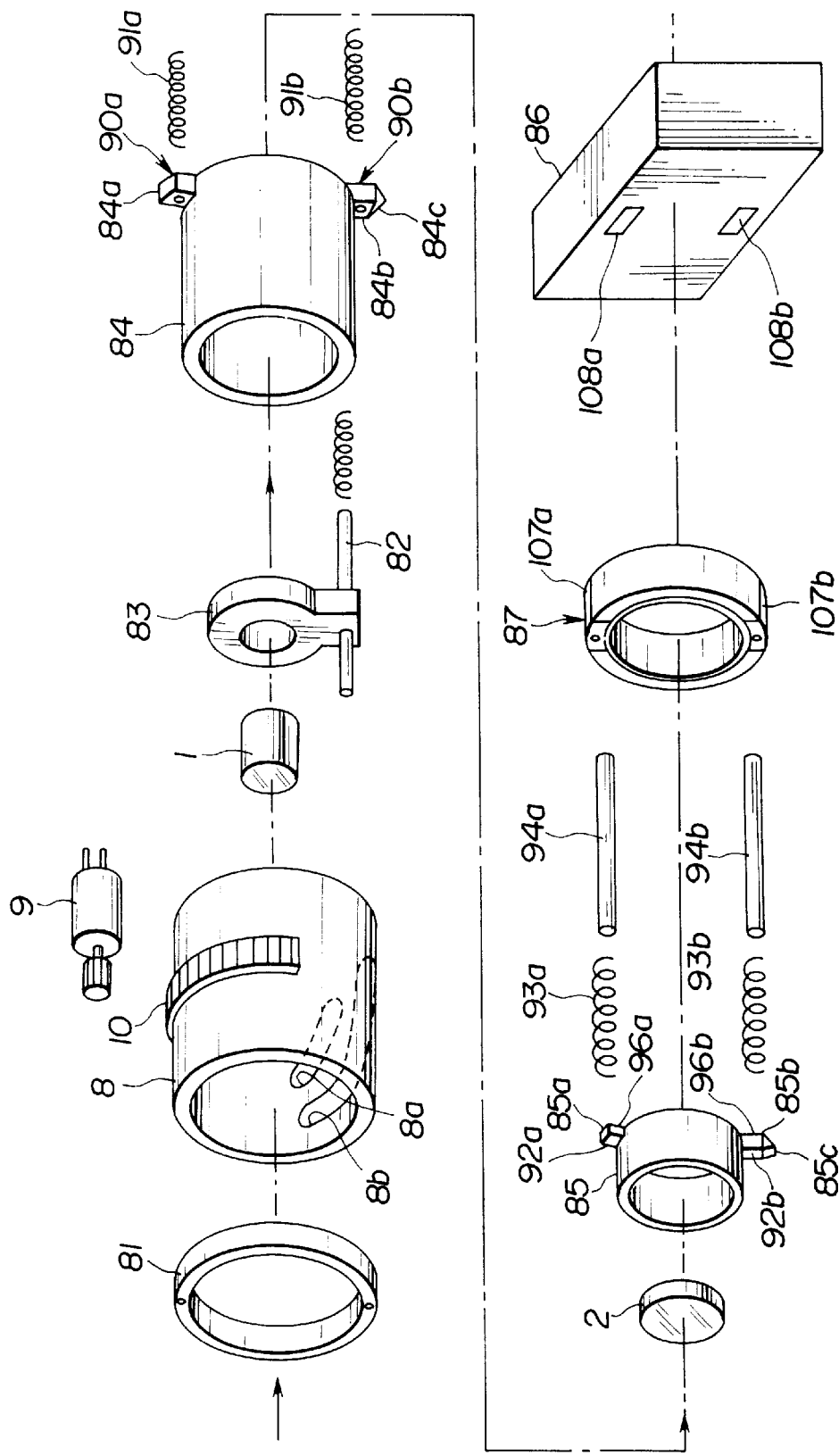
FIG. 18 is an exploded oblique view of a major portion showing the components of the imaging apparatus of the fourth embodiment.

FIG. 18 is an exploded oblique view of a major portion showing the components of an imaging apparatus of the fourth embodiment.

As illustrated, in this embodiment, a first group of lenses 1 is held in a lens holding frame 83. The first group of lenses 1 is further held in a lens holding frame 84, and movable in an optical-axis direction along with a focus operation. Likewise, a second group of lenses 2 is held in a lens holding frame 85 and movable in the optical-axis direction. The lens holding frames 84 and 85 are movable in the optical-axis direction along with a power variation operation.

The lens holding frame 84 has juts 84a and 84b jutted out from the outer circumference of the back end thereof. A cam follower 84c is formed on the top of one of the juts; the jut 84b. Juts 85a and 85b are formed on the outer circumference of the back end of the lens holding frame 85. A cam follower 85c is formed on the top of one of the juts; the jut 85b. The cam followers 84c and 85c are engaged with cam grooves formed on the inner circumference of a cam ring 8. The lens holding frames 84 and 85 are supported by an axis 94a and 94b respectively so that the holding frames can be moved in the optical-axis direction.

The lens holding frames 84 and 85 are abutted against the cam surface of the cam ring 8 by means of springs 93a, 93b, 91a, and 91b. The cam ring 8 has the thrust direction thereof restricted by a cover plate 81, and is movable only in the rotation direction thereof. The axis 94a and 94b are secured by the cover plate 81 and a locking frame 87. The springs 93a, 93b, 91a, and 91b are formed with conducting members.

Conductive parts 107a and 107b are formed on the outer circumference of the locking frame 87. One end of the springs 93a and 93b each abut against one end of the conductive parts 107a and 107b. The other ends of the conductive parts 107a and 107b are joined with conductive parts 108a and 108b formed on a main unit 86 of the imaging apparatus.

The other ends of the springs 93a and 93b abut against conductive parts 96a and 96b formed on one side of each of the juts 85a and 85b on the lens holding frame 85. One end of the springs 91a and 91b abut against conductive parts 92a and 92b formed on sides of the juts 85a and 85b. The other ends of the springs 91a and 91b abut against conductive parts 90a and 90b formed on sides of the juts 84a and 84b on the lens holding frame 84.

The conductive part 96a and conductive part 92a or the conductive part 96b and conductive part 92b are mutually electrically connected. The conductive parts 90a and 90b are connected to a sub CPU 11 incorporated in the lens holding frame 84.

In the imaging apparatus of this embodiment, after a zoom lens driving motor 9 fixed to the main unit 86 of the imaging apparatus is driven, when the cam ring 8 is rotated via a zoom lens driving conveyer 10, the lens holding frame 84 (first group of lenses 1) and lens holding frame (second group of lenses 2) are driven in the optical-axis direction according to the shapes of the cams thereof. Thus, a power variation operation is carried out.

When power is supplied from the conductive parts 108a and 108b on the main unit 86 of the imaging apparatus to the conductive parts 107a and 107b formed on the outer circumference of the locking frame 87, power is supplied to the sub CPU 11 in the lens holding frame 84 by way of the springs 93a and 93b, the conductive parts 96a, 96b, 92a, and 92b, the springs 91a and 91b, and the conductive parts 90a and 90b.

In the imaging apparatus of this embodiment, the zoom lens driving motor 9 is driven with a zoom operation. When the cam ring 8 is rotated via the zoom lens driving conveyer 10, the lens holding frame 84 and lens holding frame 85 are driven in the optical-axis direction according to the shapes of the cams thereof. The springs 93a, 93b, 91a, and 91b are always abutting on mating parts, and thus retain electrical conduction. Power is therefore led into the lens holding frame 84 and supplied to the sub CPU 11 all the time. For the purpose of improving the effect of conduction, the sub CPU 11 includes a mechanism or the like for preventing chattering.

In the imaging apparatus of this embodiment, a camera focus operation and shutter operation are identical to those in the first embodiment. The description of the operations will therefore be omitted.

In the imaging apparatus of the fourth embodiment, voice communication is used to control the actuator in the lens holding frame 84.

Figure 17:
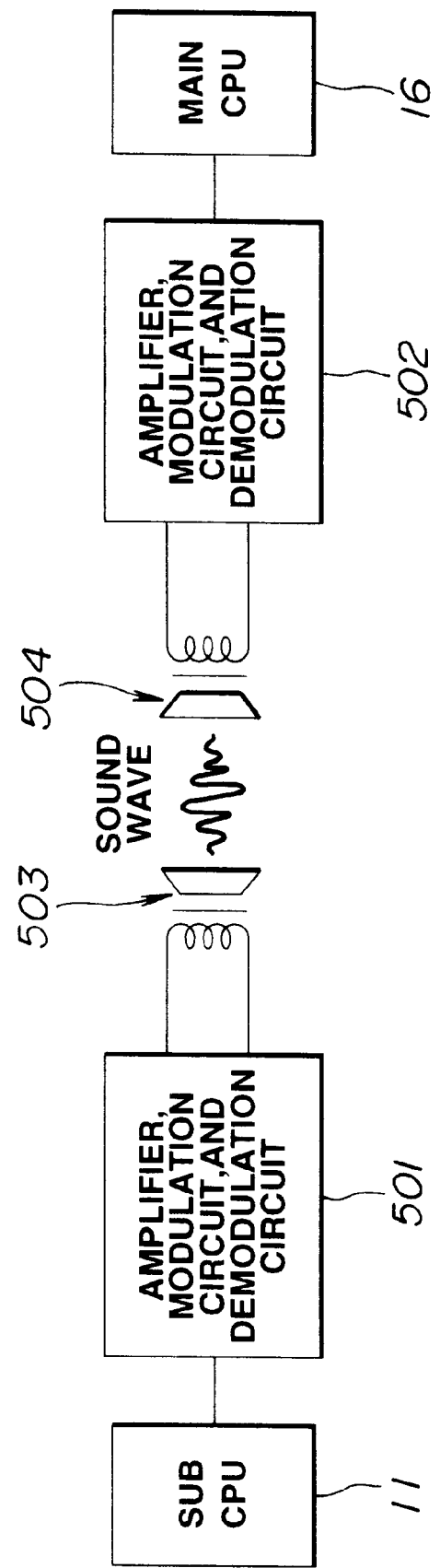
FIG. 17 is a block circuit diagram showing the configuration of a communication means in an imaging apparatus of the fourth embodiment of the present invention.

FIG. 17 is a block circuit diagram showing the configuration of a communication means in the imaging apparatus of the fourth embodiment. The communication means will be described in line with a signal flow below.

As illustrated, a signal sent from the sub CPU 11 incorporated in the lens holding frame 84 passes through an amplifier, modulation circuit, and demodulation circuit 501, and then is input or output in the form of a sound wave to or from a transmission/reception circuit 503 formed with a speaker or the like. Likewise, a transmission/reception circuit 504 formed with a speaker or the like is placed in the main unit 86 of the imaging apparatus, and transmits or receives a signal in the form of a sound wave to or from the transmission/reception circuit 503. A signal sent from the transmission/reception circuit 504 is input to the main CPU 16 via an amplifier, modulation circuit, and demodulation circuit 502.

In this embodiment, a sound wave is used for communications. The input/output blocks on the sides of the lens holding frame 84 and main unit 86 of the imaging apparatus respectively, that is, the transmission/reception circuits 503 and 504 may not necessarily have the positional relationship that they are opposed to each other.

Furthermore, in this embodiment, bi-directional transmission is achieved using data modulation of any of the ASK system shown in FIG. 21A, the FSK system shown in FIG. 21B, and the PSK system shown in FIG. 21C.

Control of a camera through communications is identical to that in the first embodiment. The description of the control will therefore be omitted.

As mentioned above, the imaging apparatus of the fourth embodiment provides the same advantages as the imaging apparatus of the first embodiment.

Next, the fifth embodiment of the present invention will be described.

Figure 22:
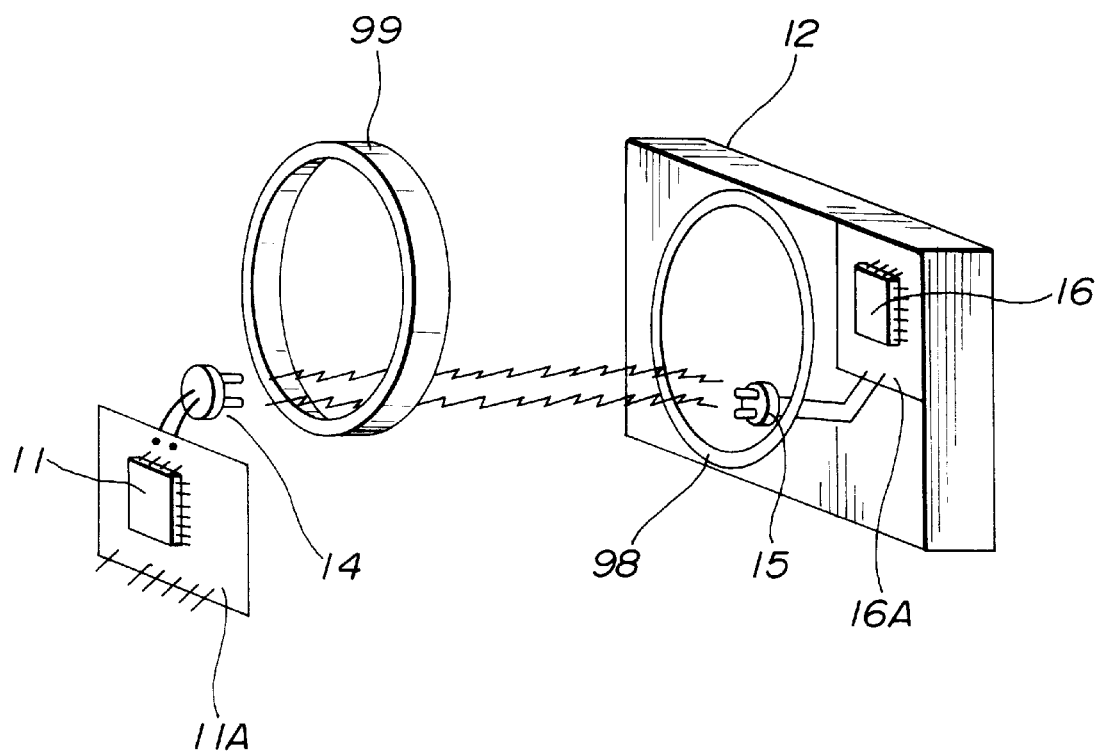
FIG. 22 is an oblique view of a major portion showing engaging portions of a main unit of an imaging apparatus of the fifth embodiment of the present invention and a lens barrel.
Figure 23:
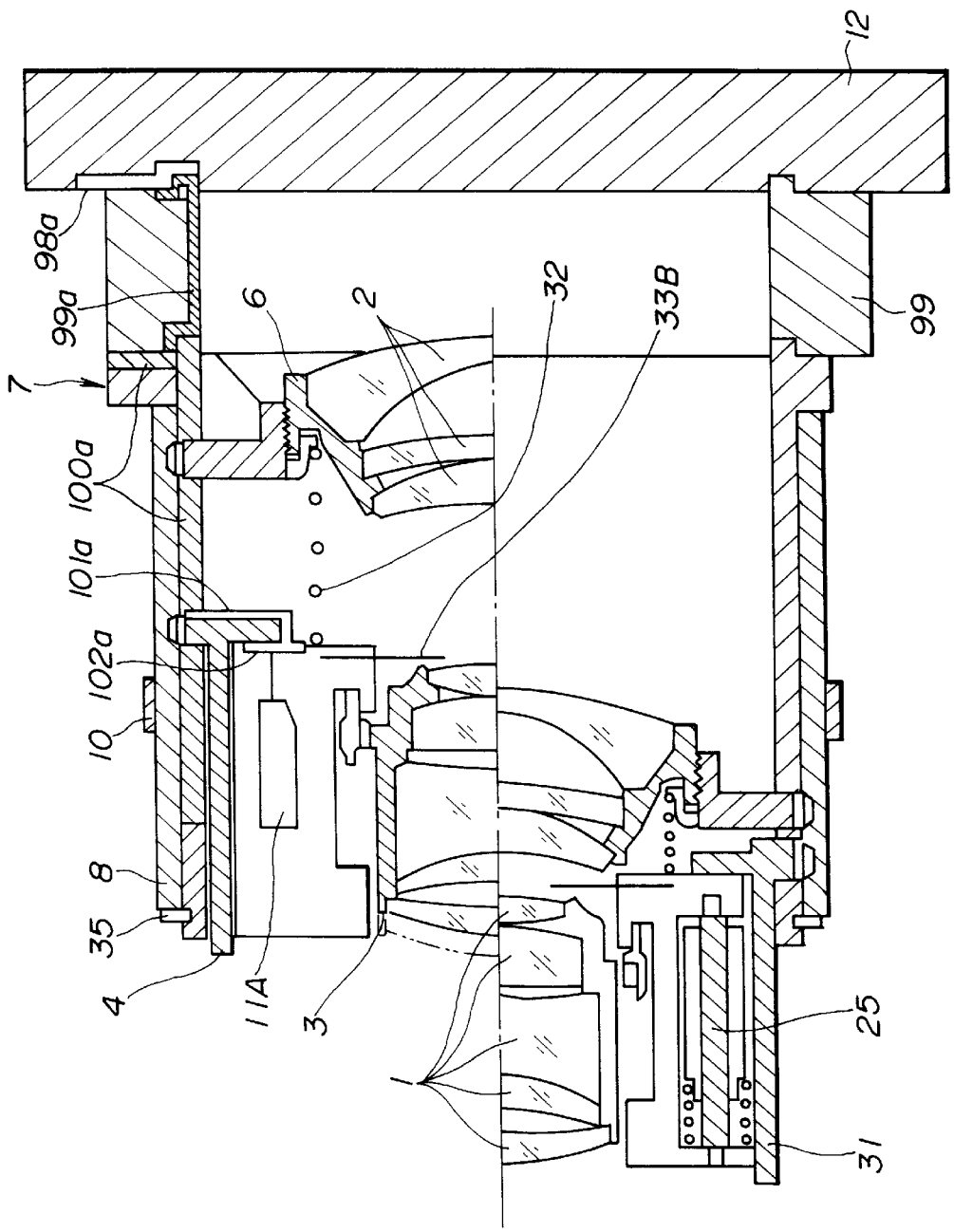
FIG. 23 is a sectional view of a major portion in which the upper section shows a wide-angle state of the imaging apparatus of the fifth embodiment and the lower section shows a telephotography state thereof.

FIGS. 22 and 23 are views showing the components of an imaging apparatus of the fifth embodiment. FIG. 22 is an oblique view of a major portion showing engaging portions of a main unit of the imaging apparatus and a lens barrel. FIG. 23 is a sectional view of a major portion in which the upper section shows a wide-angle state and the lower section shows a telephotography state.

The components of the fifth embodiment are substantially identical to those of the first embodiment. A mention will be made only of different components. The detailed description of the other components will be omitted.

As illustrated, in the imaging apparatus of the fifth embodiment, a lens barrel is attachable or detachable to or from the main unit 12 of the imaging apparatus via a lens attachment mount 98 formed on the main unit 12. An intermediate tube member 99 can be placed between the lens barrel and the main unit 12 of the imaging apparatus.

With a power variation operation of a photographic lens, the lens holding frames 4 and 5, supported in the lens barrel so that they can move in the optical-axis direction change, the positions thereof in the optical-axis direction relative to a camera body.

The intermediate tube member 99 is a camera adaptor that is interposed between the lens barrel and main unit 12 of the imaging apparatus, and that is used to vary and adjust the spacing in the optical-axis direction between the lens barrel and main unit in order to intensify the freedom of selecting a photographic power. The intermediate tube member 99 is provided with a conductive part, which is not shown, used for the electrical connection between the main unit 12 of the imaging apparatus and the lens barrel. Even when the intermediate tube member 99 is mounted, similar to when it is not mounted, power can be supplied from the main unit 12 of the imaging apparatus to the sub CPU 11 incorporated in the lens holding frame 4.

A signal representing range finding information, photometry information, or the like is transferred between the sub CPU 11 in the lens holding frame 4 and the main CPU 16 in the main unit 12 of the imaging apparatus. In the fifth embodiment, signal transmission is achieved by the same optical communication mechanism as that in the first embodiment.

In this embodiment, the stroke of a movement in the optical-axis direction of the lens holding frame 4 is absorbed in order to enable signal transmission. A clearance comparable to the width of the intermediate tube member 99 is taken into consideration, whereby even when the intermediate tube member 99 is interposed between the lens barrel and the main unit of the imaging apparatus, signal transmission through optical communication is enabled.

Thus, the imaging apparatus of the fifth embodiment provides the same advantages as the imaging apparatus of the first embodiment and can intensify the freedom of selecting a photographic power.

In this invention, it is apparent that a wide range of different working modes can be formed on the basis of this invention without a departure from the spirit and scope of the invention. This invention is not restricted to any specific embodiment but limited to the appended claims.

In the claims:

1. An imaging apparatus comprising:
   a main unit having a main power source and a main control circuit;
   a guiding frame;
   a lens frame assembly supported by said guiding frame so that it can be moved in an optical-axis direction relative to said main unit of said imaging apparatus;
   a lens frame driving mechanism for advancing and withdrawing said lens frame in the optical-axis direction relative to said main unit of said imaging apparatus;
   said assembly including a lens frame engaging and slidably guided by said guiding frame to experience only movement in the optical-axis direction;
   an actuator placed in said lens frame;
   a sub control circuit provided in said lens frame for driving and controlling said actuator;
   conducting parts respectively formed on sliding portions of said guiding frame and said movable lens frame, said conducting parts engaging one another and providing a sliding conductive path therebetween; and
   a connecting means for electrically connecting said main unit of said imaging apparatus with one of said conducting parts and for electrically connecting said sub control circuit to another one of said conducting parts for supplying power or a driving signal to said actuator.

2. An imaging apparatus according to claim 1, wherein said guiding member includes a rectilinear guide member slidably engaging portions of said lens frame for enabling said lens frame to advance or withdraw only in the optical-axis direction.

3. An imaging apparatus according to claim 1, wherein said guiding member is a locking frame wherein a backlash that may otherwise occur between said rectilinear guide portion and an engaging member projecting from said lens frame is nullified by means of a resilient constraining member provided between engaging member and said rectilinear guide member.

4. An imaging apparatus according to claim 2, wherein said guide member is one of a guide rod and a feed screw extending in the optical-axis direction and slidably engaging said lens frame.

5. An imaging apparatus according to claim 4, wherein said guide rod or feed screw and said engaging member formed on said lens frame and engaged with said guide rod or feed screw are formed of a conducting material.

6. An imaging apparatus according to claim 1, wherein said guide member is a locking frame which has rectilinear grooves formed on the locking frame, and said engagement member comprises pins fitted into said rectilinear grooves.

7. An imaging apparatus according to claim 1, wherein said lens frame driving mechanism includes a cam ring having cam grooves that are formed on said cam ring, said cam grooves receiving cam followers on said lens frame to advance or withdraw the lens frame in the optical-axis direction.

8. An imaging apparatus according to claim 7, wherein conducting members are formed on engaging sides of said cam grooves, and said cam followers are formed with conducting members.

9. An imaging apparatus according to claim 8, wherein said conducting members of said cam grooves are conductive layers formed on sides of said cam grooves.

10. An imaging apparatus according to claim 1, wherein a lens barrel in which a lens frame and other component members are incorporated is freely attachable or detachable to or from said main unit of said imaging apparatus.

11. An imaging apparatus according to claim 10, wherein an intermediate tubular-shaped member is interposed between said main unit of said imaging apparatus and said lens barrel so that the intermediate tubular shaped member can be removed freely.

12. An imaging apparatus according to claim 11, wherein said intermediate tubular-shaped member includes a means for electrically connecting said main power source in said main unit of said imaging apparatus with said actuator in said lens barrel.

13. An imaging apparatus having a main unit that includes a main power source, and a lens barrel attachable or detachable to or from the imaging apparatus, comprising:
   a lens frame incorporated in said lens barrel and supported so that it can be moved in an optical-axis direction relative to said main unit of said imaging apparatus;
   a lens frame driving mechanism incorporated in said lens barrel for advancing or withdrawing said lens frame in the optical-axis direction relative to said main unit of said imaging apparatus;
   an actuator placed in said lens frame; and
   a first conducting member provided on an exposed surface of said lens frame driving mechanism and slidably engaging a second conducting member provided on said lens frame for electrically connecting said main unit of said imaging apparatus with said actuator and for supplying at least one of a power and a driving signal to said actuator.

14. An imaging apparatus according to claim 13, wherein said lens frame driving mechanism includes a rectilinear guide member for enabling said lens frame to advance or withdraw only in the optical-axis direction, and an engaging member slidably engaging said rectilinear guide member.

15. An imaging apparatus according to claim 14, wherein a backlash that may otherwise occur between said rectilinear guide member and engaging member is nullified by means of a resilient constraining member arranged between said engaging member and said guide member.

16. An imaging apparatus according to claim 14, wherein said rectilinear guide member is one of a guide rod and a feed screw extending in the optical-axis direction.

17. An imaging apparatus according to claim 16, wherein said guide rod of feed screw and said engaging member formed on said lens frame and engaged with said guide rod or feed screw are formed of conducting members.

18. An imaging apparatus according to claim 14, wherein said rectilinear guide member comprises rectilinear grooves, and said engagement member comprises pins fitted into said rectilinear grooves.

19. An imaging apparatus according to claim 13, wherein said lens frame driving mechanism comprises a cam ring which includes cam grooves that are formed in said cam ring, said cam grooves receiving cam followers on said lens frame to enable said lens frame to advance or withdraw in the optical-axis direction.

20. An imaging apparatus according to claim 19, wherein conducting members are formed on sides of said cam grooves, and said cam followers are formed with conducting members slidably engaging said sides of said cam grooves.

21. An imaging apparatus according to claim 20, wherein said conducting members of said cam grooves are conductive layers formed on the sides of said cam grooves.

22. An imaging apparatus according to claim 13, wherein a lens barrel in which a lens frame and other component members are incorporated is freely attachable or detachable to or from said main unit of said imaging apparatus.

23. An imaging apparatus according to claim 22, wherein an intermediate tubular-shaped member is interposed between said main unit of said imaging apparatus and said lens barrel so that the intermediate tubular-shaped member can be removed freely.

24. An imaging apparatus according to claim 23, wherein said intermediate tubular-shaped member includes a means for electrically connecting said main power source in said main unit of said imaging apparatus with said actuator in said lens barrel.

25. An imaging apparatus according to claim 13, wherein an intermediate tubular-shaped member is interposed between said main unit of said imaging apparatus and said lens barrel so that the intermediate tubular-shaped member can be removed freely.

26. An imaging apparatus according to claim 25, wherein said intermediate tubular-shaped member includes a means for electrically connecting said main power source in said main unit of said imaging apparatus with said actuator in said lens barrel.

27. An imaging apparatus having a main power source in a main unit thereof, comprising:
- a lens frame supported so that it can be moved in an optical-axis direction relative to said main unit of said imaging apparatus;
- an actuator placed in the lens frame;
- a first signal processor placed in said main unit of said imaging apparatus for controlling said actuator;
- a second signal processor placed in said lens frame for processing a signal used to control said actuator;
- a guiding member for slidably guiding the lens frame to move only in the direction of the optical axis;
- a first conducting member on said guiding member slidingly engaging a second conducting member on said lens frame; said first and second conducting members being respectively coupled to said main control unit and said actuator for providing a sliding conductive connection between said main control unit and said actuator; and
- a communication means for enabling data communications between said first signal processor and second signal processor.

28. An imaging apparatus according to claim 27, wherein a lens barrel in which a lens frame and other component members are incorporated is freely attachable or detachable to or from said main unit of said imaging apparatus.

29. An imaging apparatus according to claim 28, wherein an intermediate tubular-shaped member is interposed between said main unit of said imaging apparatus and said lens barrel so that the intermediate tubular-shaped member can be removed freely.

30. An imaging apparatus according to claim 29, wherein said intermediate tubular-shaped member includes a means for electrically connecting said main power source in said main unit of said imaging apparatus with said actuator in said lens barrel.

31. An imaging apparatus according to claim 27, wherein said communication means employs at least one of optical communication, wire communication, radio communication, and sound communication means.

32. An imaging apparatus according to claim 27, wherein said communication means performs bidirectional transmission.

33. An imaging apparatus according to claim 27, wherein said communication means includes two pairs of a light emitting device and light receiving device and performs transmission using at least one of an ASK (amplitude modulation) system, PSK (phase modulation) system, and FSK (frequency modulation) system.

34. An imaging apparatus according to claim 27, wherein said communication means includes a sound transfer means and performs transmission using at least one of an ASK system, PSK system, and FSK system.

35. An imaging apparatus having a main power source in a main unit thereof, comprising:
- a lens frame supported so that it can be moved in an optical-axis direction relative to said main unit of said imaging apparatus;
- an actuator placed in said lens frame;
- a first signal processor placed in said main unit of said imaging apparatus for controlling said actuator;
- a second signal processor placed in said lens frame for processing a signal used to control said actuator;
- a communication means for enabling data communications between said first signal processor and second signal processor;
- a lens frame driving mechanism for advancing or withdrawing said lens frame in the optical-axis direction relative to said main unit of said imaging apparatus; and
- conductive members provided on said lens frame driving mechanism and said lens frame slidably engaging one another for electrically connecting said main unit of said imaging apparatus with said actuator and for supplying power to said actuator.

36. An imaging apparatus according to claim 35, wherein a lens barrel in which a lens frame and other component members are incorporated is freely attachable or detachable to or from said main unit of said imaging apparatus.

37. An imaging apparatus according to claim 35, wherein an intermediate tubular-shaped member is interposed between said main unit of said imaging apparatus and said lens barrel so that the intermediate tubular-shaped member can be removed freely.

38. An imaging apparatus according to claim 37, wherein an intermediate tubular-shaped member includes a means for electrically connecting said main power source in said main unit of said imaging apparatus with said actuator in said lens barrel.

39. An imaging apparatus according to claim 35, wherein said communication means employs at least one of optical communication, wire communication, radio communication, and sound communication means.

40. An imaging apparatus according to claim 35, wherein said communication means performs bi-directional transmission.

41. An imaging apparatus according to claim 35, wherein said communication means includes two pairs of a light emitting device and light receiving device and performs transmission using at least one of an ASK (amplitude modulation) system, PSK (phase modulation) system, and FSK (frequency modulation) system.

42. An imaging apparatus according to claim 35, wherein said communication means includes a sound transfer means and performs transmission using at least one of an ASK system, PSK system, and FSK system.

43. An imaging apparatus having a main power source in a main unit thereof, comprising:
- a lens frame supported so that it can be moved in an optical-axis direction relative to said main unit of said imaging apparatus;

a lens frame driving mechanism for advancing or withdrawing said lens frame in the optical-axis direction relative to said main unit of said imaging apparatus;

an actuator placed is said lens frame;

a conductive member included in said lens frame driving mechanism slidably engaging a conducting member in said lens frame for electrically connecting said main unit of said imaging apparatus with said actuator and for supplying power to said actuator;

a first signal processor placed in said main unit of said imaging apparatus for controlling said actuator;

a second signal processor placed in said lens frame for processing a signal used to control said actuator;

a communication means for enabling data communications between said first signal processor and second signal processor and placing said data communications signal on said connecting means.

44. An imaging apparatus according to claim 43, wherein said lens frame driving mechanism includes a rectilinear guide member for enabling said lens frame to advance or withdraw only in the optical-axis direction, and an engaging member slidably engaging said rectilinear guide member.

45. An imaging apparatus according to claim 44, wherein a backlash that may occur between said rectilinear guide member and engaging member is nullified by means of a resilient constraining member positioned between said guide member and said engaging member.

46. An imaging apparatus according to claim 44, wherein said rectilinear guide member is one of a guide rod and feed screw extending in the opticalaxis direction.

47. An imaging apparatus according to claim 46, wherein said guide rod or feed screw and said engaging member formed on said lens frame and engaged with said guide rod or feed screw are formed of conducting members.

48. An imaging apparatus according to claim 44, wherein said rectilinear guide member comprises rectilinear grooves formed on another lens frame, and said engagement member comprises pins fitted into said rectilinear grooves.

49. An imaging apparatus according to claim 43, wherein said lens frame driving mechanism includes a cam ring having cam grooves that are formed on said cam ring, said lens frame having cam followers engaging said cam grooves to enable said lens frame to advance or withdraw in the optical-axis direction.

50. An imaging apparatus according to claim 49, wherein conducting members are formed on engaging sides of said cam grooves, and said cam followers are formed with conducting members slidably engaging said engaging sides of said cam grooves.

51. An imaging apparatus according to claim 50, wherein said conducting members of said cam grooves are conductive layers formed on the cam sides of said cam grooves.

52. An imaging apparatus according to claim 43, wherein a lens barrel in which a lens frame and other component members are incorporated is freely attachable or detachable to or from said main unit of said imaging apparatus.

53. An imaging apparatus according to claim 52, wherein an intermediate tubular-shaped member is interposed between said main unit of said imaging apparatus and said lens barrel so that the intermediate tubular shaped member can be removed freely.

54. An imaging apparatus according to claim 53, wherein said intermediate tubular-shaped member includes a means for electrically connecting said main power source in said main unit of said imaging apparatus with said actuator in said lens barrel.

55. An imaging apparatus according to claim 43, wherein said communication means includes a sound transfer means and performs transmission using at least one of an amplitude modulation system, phase modulation system, and frequency modulation system.

56. An imaging apparatus according to claim 1, comprising:

a communication means for enabling communication between said main unit of said imaging apparatus and said sub control circuit of said movable frame by a signal which is one of an electric wave and a sound wave in order to control said actuator of said lens frame.

57. An imaging apparatus according to claim 6, wherein said grooves are cam grooves formed on said locking frame and said pins are cam followers slidably engaging said cam grooves; and said conducting parts are respectively formed on the surfaces of said cam grooves and said cam followers.

58. An imaging apparatus according to claim 57, wherein said conducting parts on said cam grooves are conducting patterns formed on sides of said cam grooves in a direction perpendicular to an internal surface of said lens frame.

59. An imaging apparatus according to claim 1, further comprising:

a cam ring provided so as to be rotatable relative to said locking frame, wherein said cam ring has bottomed cam grooves formed in said cam ring and said lens frame has cam followers provided thereon for slidably engaging at least a bottom surface of said cam grooves; and said conducting parts are formed at the bottom surfaces of said cam grooves with which said cam followers slidably engage.

60. An apparatus according to claim 1, further comprising:

said lens frame having a threaded bore;

a feed screw driven by said actuator and meshed with said threaded bore provided in said lens frame to move said lens frame in the optical-axis direction by rotating said feed screw;

wherein said conducting parts include said feed screw being formed of conductive material and a conductive member in said lens frame slidably engaging said feed screw.

61. An imaging apparatus comprising:

a main unit of said imaging apparatus having a main power source;

a lens frame assembly having movable lens holding frames supported so as to be movable in the optical-axis direction relative to said main body of said imaging apparatus; a sub control circuit provided in one of said lens frames for driving and controlling an actuator provided in said one lens frame; and a lens frame driving member, said lens frame driving member having a mechanical function for driving said movable frames, and also an electrical function including an integral conductive member for providing an electrical connection between said sub control circuit and said main power source of said main unit of said imaging apparatus, including a sliding contact between said integral conductive member and a conductive member forming an integral part of said lens frame to supply power from said main power source of said main unit of said imaging apparatus to said sub control circuit even during movement of the movable frames in the optical-axis direction.

62. An imaging apparatus according to claim 61, wherein said lens frame has rectilinear guide grooves for rectilinearly guiding said movable frames in the optical-axis direction and an engagement part that is provided on said movable frames to slidably engage said rectilinear guide grooves; and said lens frame driving member has conducting parts that are formed on the sliding surface of said rectilinear guide grooves and said engagement part.

* * * * *